(12) United States Patent
Miyamoto et al.

(10) Patent No.: US 9,641,501 B2
(45) Date of Patent: May 2, 2017

(54) CONTENT SHARING SYSTEM, CONTENT SHARING METHOD, AND INFORMATION COMMUNICATION APPARATUS

(71) Applicant: Panasonic Intellectual Property Corporation of America, Torrance, CA (US)

(72) Inventors: Shingo Miyamoto, Hyogo (JP); Keiji Icho, Osaka (JP); Kento Ogawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 40 days.

(21) Appl. No.: 14/377,626

(22) PCT Filed: Dec. 6, 2013

(86) PCT No.: PCT/JP2013/007179
§ 371 (c)(1),
(2) Date: Aug. 8, 2014

(87) PCT Pub. No.: WO2014/091728
PCT Pub. Date: Jun. 19, 2014

(65) Prior Publication Data
US 2015/0058948 A1     Feb. 26, 2015

(30) Foreign Application Priority Data

Dec. 13, 2012 (JP) ................................. 2012-272848

(51) Int. Cl.
*G06F 17/30* (2006.01)
*G06F 3/048* (2013.01)
(Continued)

(52) U.S. Cl.
CPC .............. *H04L 63/08* (2013.01); *G06F 21/62* (2013.01); *H04L 51/32* (2013.01); *H04L 65/403* (2013.01); *H04W 12/06* (2013.01)

(58) Field of Classification Search
CPC ......... G06F 21/62; H04L 51/32; H04L 63/08; H04L 65/403; H04W 12/06
See application file for complete search history.

(56) References Cited

U.S. PATENT DOCUMENTS 6,105,055 A * 8/2000 Pizano ................... G06Q 10/10
709/201
6,157,401 A * 12/2000 Wiryaman .......... H04L 12/1822
348/14.08

(Continued)

FOREIGN PATENT DOCUMENTS

JP      2005-190135      7/2005
JP      2008-197746      8/2008

(Continued)

OTHER PUBLICATIONS

Ensor, Benjamin, T. Montez, and P. Wannemacher. "The state of mobile banking 2012." Cambridge, MA: Forrester Research (2012).*

(Continued)

*Primary Examiner* — Michael Simitoski
(74) *Attorney, Agent, or Firm* — Wenderoth, Lind & Ponack, L.L.P.

(57) ABSTRACT

A content sharing system includes: a server; a first information communication apparatus; and a second information communication apparatus, in which the first information communication apparatus includes a reserve requesting unit which sends to the server a reserve request message for requesting to reserve a sharing space to be newly generated, the reserve request message including first identification information for identifying the second information commu- (Continued)

nication apparatus or the user using the second information communication apparatus, and the server includes: a first storage; and a sharing space generating unit which, upon receiving the reserve request message, generates the sharing space in the first storage, and stores in the first storage the first identification information included in the reserve request message.

12 Claims, 17 Drawing Sheets

(51) Int. Cl.
*G06F 21/31* (2013.01)
*H04L 29/06* (2006.01)
*G06F 21/62* (2013.01)
*H04L 12/58* (2006.01)
*H04W 12/06* (2009.01)
*G06F 3/01* (2006.01)
*G06Q 10/10* (2012.01)

(56) References Cited

U.S. PATENT DOCUMENTS

| | | | | |
|---|---|---|---|---|
| 6,594,664 B1* | 7/2003 | Estrada | G06F 17/30873 | |
| 6,629,129 B1* | 9/2003 | Bookspan | G06Q 10/10 | 709/204 |
| 6,829,593 B1* | 12/2004 | Ritter | H04M 3/42229 | 455/411 |
| 7,191,214 B2* | 3/2007 | Watanabe | H04L 12/1813 | 709/203 |
| 7,213,050 B1* | 5/2007 | Shaffer | H04L 12/1813 | 370/261 |
| 7,231,423 B1* | 6/2007 | Horstmann | H04L 12/1813 | 709/204 |
| 7,360,164 B2* | 4/2008 | Bjoernsen | G06Q 10/10 | 709/203 |
| 7,505,574 B2* | 3/2009 | O'Brien | H04M 3/56 | 370/352 |
| 7,698,660 B2 | 4/2010 | Sanchez et al. | | |
| 7,933,952 B2* | 4/2011 | Parker | H04L 12/1813 | 709/204 |
| 8,245,141 B1* | 8/2012 | Fuller | H04L 12/1822 | 709/223 |
| 8,280,948 B1* | 10/2012 | Chen | H04N 21/4402 | 709/203 |
| 8,708,227 B1* | 4/2014 | Oakes, III | G06Q 20/04 | 235/379 |
| 8,731,168 B1* | 5/2014 | Webster | H04L 12/1822 | 379/202.01 |
| 8,769,012 B1* | 7/2014 | Shah | G06Q 50/01 | 709/204 |
| 8,775,940 B2* | 7/2014 | Beringer | G06F 8/38 | 715/733 |
| 8,868,923 B1* | 10/2014 | Hamlet | H04L 9/00 | 326/8 |
| 8,990,328 B1* | 3/2015 | Grigsby | H04L 12/1845 | 709/203 |
| 9,183,520 B2* | 11/2015 | Davis | G06Q 10/06 | |
| 9,195,819 B2* | 11/2015 | Hudson | G06F 3/0483 | |
| 2002/0080173 A1* | 6/2002 | Tagami | A63F 13/12 | 715/753 |
| 2002/0161688 A1* | 10/2002 | Stewart | G06Q 10/06 | 705/37 |
| 2003/0046134 A1* | 3/2003 | Frolick | G06Q 10/063118 | 705/7.17 |
| 2003/0065722 A1* | 4/2003 | Ieperen | G06F 21/31 | 709/205 |
| 2003/0085923 A1* | 5/2003 | Chen | H04L 12/1813 | 715/751 |
| 2004/0006697 A1* | 1/2004 | Noyama | H04L 9/32 | 713/182 |
| 2004/0054724 A1* | 3/2004 | Sudo | H04M 3/56 | 709/204 |
| 2004/0174392 A1* | 9/2004 | Bjoernsen | G06Q 10/10 | 715/751 |
| 2004/0199580 A1* | 10/2004 | Zhakov | H04L 12/1818 | 709/204 |
| 2005/0010640 A1* | 1/2005 | Cannata | G06Q 10/10 | 709/205 |
| 2005/0018826 A1* | 1/2005 | Benco | H04M 3/565 | 379/202.01 |
| 2005/0097440 A1* | 5/2005 | Lusk | G06Q 10/10 | 715/758 |
| 2005/0132221 A1* | 6/2005 | Marcjan | H04L 63/029 | 726/4 |
| 2005/0138566 A1* | 6/2005 | Muller | G06Q 10/00 | 715/759 |
| 2005/0198140 A1* | 9/2005 | Itoh | H04L 12/1813 | 709/205 |
| 2005/0213724 A1* | 9/2005 | O'Brien | H04M 3/56 | 379/202.01 |
| 2006/0026502 A1* | 2/2006 | Dutta | G06Q 10/10 | 715/230 |
| 2006/0053380 A1* | 3/2006 | Spataro | G06F 17/30011 | 715/753 |
| 2006/0062367 A1* | 3/2006 | Christenson | G06Q 10/1095 | 379/202.01 |
| 2006/0069656 A1* | 3/2006 | Horikiri | G06Q 10/10 | 705/71 |
| 2006/0080432 A1* | 4/2006 | Spataro | H04L 12/1831 | 709/224 |
| 2006/0285671 A1* | 12/2006 | Tiruthani | H04M 3/382 | 379/202.01 |
| 2007/0130143 A1* | 6/2007 | Zhang | G06F 17/30893 | |
| 2007/0226321 A1* | 9/2007 | Bengtson | H04N 1/00244 | 709/219 |
| 2008/0046984 A1* | 2/2008 | Bohmer | H04L 63/0853 | 726/5 |
| 2008/0114844 A1* | 5/2008 | Sanchez | G06F 9/4443 | 709/206 |
| 2008/0275955 A1* | 11/2008 | Yamazaki | H04L 12/581 | 709/205 |
| 2009/0013043 A1* | 1/2009 | Tan | G06Q 10/107 | 709/205 |
| 2009/0293110 A1* | 11/2009 | Koga | G06F 21/36 | 726/6 |
| 2009/0305688 A1* | 12/2009 | Bonnet | H04L 12/1822 | 455/422.1 |
| 2009/0307605 A1* | 12/2009 | Ryan | G06Q 10/10 | 715/751 |
| 2009/0319576 A1* | 12/2009 | Srour | H04L 41/0806 | |
| 2010/0061538 A1* | 3/2010 | Coleman | H04L 12/1818 | 379/202.01 |
| 2010/0153857 A1 | 6/2010 | Sanchez et al. | | |
| 2010/0251140 A1* | 9/2010 | Tipirneni | G06F 3/011 | 715/753 |
| 2011/0088083 A1* | 4/2011 | Ficko | G06F 21/34 | 726/5 |
| 2012/0075491 A1* | 3/2012 | Hoarau | G06F 3/1204 | 348/222.1 |
| 2012/0162436 A1* | 6/2012 | Cordell | G11B 27/10 | 348/158 |
| 2012/0198521 A1 | 8/2012 | Urakawa | | |
| 2012/0198570 A1* | 8/2012 | Joa | G06F 21/30 | 726/30 |
| 2012/0203701 A1* | 8/2012 | Ayuso de Paul | H04L 63/061 | 705/71 |
| 2012/0246463 A1* | 9/2012 | Shea | H04L 63/061 | 713/153 |
| 2012/0300677 A1* | 11/2012 | Forsberg | H04L 65/1016 | 370/261 |
| 2012/0324002 A1* | 12/2012 | Chen | G06F 17/30274 | 709/204 |
| 2013/0066963 A1* | 3/2013 | Odio | G06Q 10/10 | 709/204 |
| 2013/0091188 A1* | 4/2013 | Du | H04L 67/1097 | 707/827 |

(56) References Cited

U.S. PATENT DOCUMENTS

| | | | |
|---|---|---|---|
| 2013/0132528 A1 | 5/2013 | Enomoto et al. | |
| 2013/0279765 A1* | 10/2013 | Fondeur | G06F 21/31 382/115 |
| 2013/0290416 A1* | 10/2013 | Nelson | G06Q 10/10 709/204 |
| 2013/0332856 A1* | 12/2013 | Sanders | G06F 3/0481 715/753 |
| 2014/0029474 A1* | 1/2014 | Bhagavatula | H04L 65/1093 370/260 |
| 2014/0031019 A1* | 1/2014 | Qi | H04W 4/00 455/416 |
| 2014/0095871 A1* | 4/2014 | Hoard | H04L 63/0428 713/168 |
| 2014/0109208 A1* | 4/2014 | Song | G06F 21/36 726/7 |
| 2014/0197232 A1* | 7/2014 | Birkler | G06F 21/313 235/375 |
| 2014/0226535 A1* | 8/2014 | Forsberg | H04L 65/00 370/259 |
| 2015/0017959 A1* | 1/2015 | Leboucher | H04L 67/306 455/415 |
| 2015/0058948 A1* | 2/2015 | Miyamoto | G06F 21/62 726/7 |
| 2015/0195261 A1* | 7/2015 | Gehrmann | H04L 9/0833 726/7 |

FOREIGN PATENT DOCUMENTS

| | | |
|---|---|---|
| JP | 2010-509697 | 3/2010 |
| JP | 2011-138193 | 7/2011 |
| JP | 2012-38193 | 2/2012 |
| JP | 2012-160853 | 8/2012 |
| WO | 2008/063833 | 5/2008 |

OTHER PUBLICATIONS

International Search Report issued Mar. 4, 2014 in corresponding International Application No. PCT/JP2013/007179.

* cited by examiner

FIG. 7

| Connection request message | | |
|---|---|---|
| Sharing space specifying information | Contact information of second information communication apparatus | Authentication information |
| 012-3456-**** | 098-7654-**** | Keyword 1 |
| 124 | 125 | 126 |

FIG. 8

| Sharing space ID | Sharing space address information | Contact information | | Authentication information |
|---|---|---|---|---|
| | | First information communication apparatus | Second information communication apparatus | |
| 1111111111 | http://www.common.space.com/1111111111/ | 012-3456-**** | 098-7654-**** | Keyword 1 |
| | | | 234-5678-**** | |
| 1111111112 | http://www.common.space.com/1111111112/ | 345-6789-**** | 456-7890-**** | Keyword 2 |
| | | | 567-8901-**** | |
| | | | 678-9012-**** | |
| ... | ... | ... | ... | ... |
| 1111111234 | http://www.common.space.com/1111111234/ | 789-0123-**** | 890-1234-**** | Keyword 3 |
| | | | 901-2345-**** | |

141, 142, 144, 143, 145, 146, 150

CONTENT SHARING SYSTEM, CONTENT SHARING METHOD, AND INFORMATION COMMUNICATION APPARATUS

TECHNICAL FIELD

The present invention relates to a content sharing system, a content sharing method, and an information communication apparatus.

BACKGROUND ART

In recent years, with the popularization of mobile terminals such as digital cameras and smart phones, and the advancement of social networking services (SNS) such as mixi (registered trademark), Facebook (registered trademark), and Flickr (registered trademark); and other content sharing services, users have more opportunities for easily capturing content such as pictures and videos, and for sharing them for fun.

Conventionally, as a system for sharing content, there has been a system for sharing content among users (terminals) who have registered their user information with a server or service in advance (see Patent Literature (PTL) 1, for example).

Furthermore, there has been a system for sharing content among users who have exchanged necessary user information in advance (see PTL 2, for example).

CITATION LIST

Patent Literature

[PTL 1] Japanese Unexamined Patent Application Publication No. 2008-197746
[PTL 2] Japanese Unexamined Patent Application Publication No. 2012-038193

SUMMARY OF INVENTION

Technical Problem

With such a content sharing system, however, it is desired to share content with a more simple operation.

In view of the above, an object of the present invention is to provide a content sharing system, a content sharing method, and an information communication apparatus for sharing content with a simplified user operation.

Solution to Problem

In order to solve the above-described problem, a content sharing system according to an aspect of the present invention is a content sharing system including: a server; a first information communication apparatus; and a second information communication apparatus, in which content is shared between a first user using the first information communication apparatus and a second user using the second information communication apparatus, using a sharing space which is a storage area on the server, the first information communication apparatus includes a reserve requesting unit which sends to the server a reserve request message for requesting to reserve the sharing space to be newly generated, the reserve request message including first identification information for identifying the second information communication apparatus or the second user, the server includes: a first storage; and a sharing space generating unit which, upon receiving the reserve request message, generates the sharing space in the first storage, and stores in the first storage the first identification information included in the reserve request message, the second information communication apparatus includes a connection requesting unit which sends to the server a connection request message including second identification information for identifying the second information communication apparatus or the second user, and the server further includes a connection control unit which allows the second information communication apparatus to access the sharing space when the second identification information included in the connection request message matches the first identification information stored in the first storage, and prohibits the second information communication apparatus from accessing the sharing space when the second identification information fails to match the first identification information.

It is to be noted that these general and specific aspects may be implemented using a system, a method, an integrated circuit, a computer program, or a computer readable recording medium such as a CD-ROM, or any combination of systems, methods, integrated circuits, computer programs, or recording media.

Advantageous Effects of Invention

The present invention provides a content sharing system, a content sharing method, and an information communication apparatus for sharing content with a simplified user operation.

BRIEF DESCRIPTION OF DRAWINGS

FIG. 7 is a diagram illustrating an example of a connection request message according to the exemplary embodiment.

FIG. 8 is a diagram illustrating an example of sharing space management information according to the exemplary embodiment.

DESCRIPTION OF EMBODIMENTS

Figure 1:
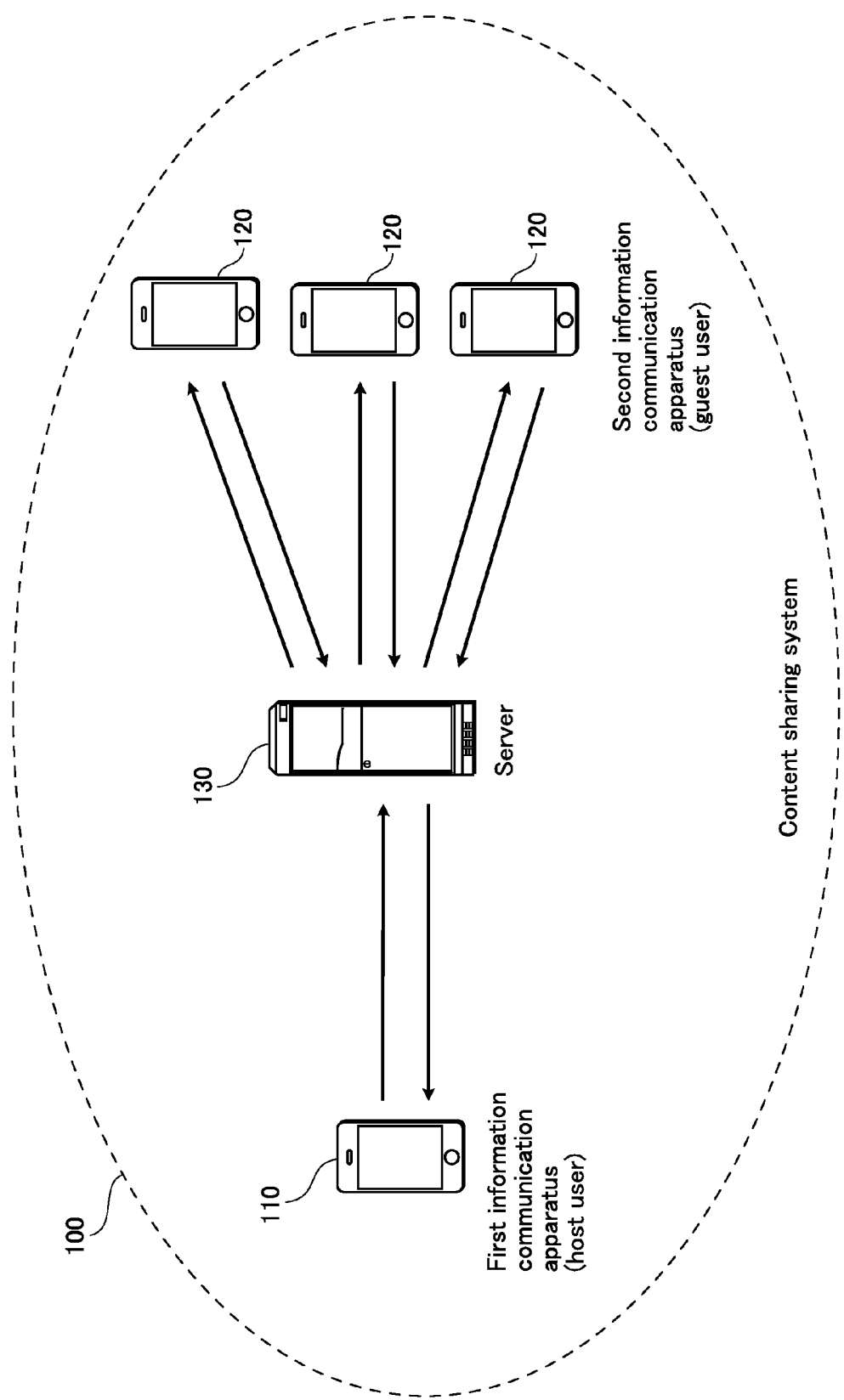
FIG. 1 is a diagram illustrating an outline of a content sharing system according to an exemplary embodiment.

Underlying Knowledge Forming Basis of the Present Invention

The inventors have been found that the content sharing systems described in the "Background Art" have following disadvantages.

For example, it may be desired to share content right away among members participating in an event. In particular, when a commemorative picture is taken, it may be desired to share the picture on the spot among all members who were involved in the picture, or when pictures are taken at a dinner party or the like, it may be desired to share the pictures on the spot.

Even in such a case, however, in order to share content, the conventional content sharing systems require the involved members to conduct a complicated process of registering their user information.

For example, a content sharing service such as SNS requires registration to share content. Accordingly, when any of members participating in the event are not users of the service, they need to register with the service. Furthermore, in such a service, the registration of users who share content has to be done in advance. Accordingly, it is necessary to conduct the registration process for the users.

In view of the above-described problem, the following describes a content sharing system for sharing content among members participating in an event, with a simple operation.

A content sharing system according to an aspect of the present invention includes: a server; a first information communication apparatus; and a second information communication apparatus, in which content is shared between a first user using the first information communication apparatus and a second user using the second information communication apparatus, using a sharing space which is a storage area on the server, the first information communication apparatus includes a reserve requesting unit which sends to the server a reserve request message for requesting to reserve the sharing space to be newly generated, the reserve request message including first identification information for identifying the second information communication apparatus or the second user, the server includes: a first storage; and a sharing space generating unit which, upon receiving the reserve request message, generates the sharing space in the first storage, and stores in the first storage the first identification information included in the reserve request message, the second information communication apparatus includes a connection requesting unit which sends to the server a connection request message including second identification information for identifying the second information communication apparatus or the second user, and the server further includes a connection control unit which allows the second information communication apparatus to access the sharing space when the second identification information included in the connection request message matches the first identification information stored in the first storage, and prohibits the second information communication apparatus from accessing the sharing space when the second identification information fails to match the first identification information.

With this, it is possible to share the content between the first information communication apparatus and the second information communication apparatus in a simple way that (i) the first information communication apparatus sends to the server the reserve request message including information for identifying the second information communication apparatus or the second user and (ii) the second information communication apparatus sends to the server the connection request message including information for identifying the second information communication apparatus or the second user. In this way, the content sharing system allows content to be shared among members participating in an event, with a simple operation.

For example, the second information communication apparatus may further include a second storage which stores the second identification information and to which access is restricted, and the connection requesting unit may retrieve the second identification information from the second storage, and send to the server the connection request message including the retrieved second identification information.

With this, it is possible to prevent tampering with the second identification information, thereby preventing unauthorized access to the sharing space.

For example, the second storage may be a subscriber identity module (SIM) card.

With this, it is possible to prevent tampering with the second identification information, thereby preventing unauthorized access to the sharing space.

For example, the reserve request message may further include first authentication information, the sharing space generating unit may further store in the first storage the first authentication information included in the reserve request message, the connection request message may further include second authentication information, and the connection control unit may allow the second information communication apparatus to access the sharing space when (i) the second identification information matches the first identification information and (ii) the second authentication information included in the connection request message matches the first authentication information stored in the first storage, and prohibit the second information communication apparatus from accessing the sharing space when the second authentication information fails to match the first authentication information.

With this, it is possible to prevent unauthorized access to the sharing space.

For example, the first authentication information and the second authentication information may be a predetermined keyword.

With this, it is possible to easily determine the authentication information, for example, by using a keyword selected by members participating in an event, and to prevent unauthorized access to the sharing space.

For example, the first authentication information may be a first image captured by the first information communication apparatus, the second authentication information may be a second image captured by the second information communication apparatus, and the connection control unit may determine that the first authentication information matches the second authentication information when a same object is included in the first mage and the second image.

With this, it is possible to easily determine the authentication information, for example, by using the same object captured by members participating in an event, and to prevent unauthorized access to the sharing space.

For example, the first authentication information and the second authentication information may be information for identifying the first information communication apparatus or the first user.

With this, it is possible to prevent unauthorized access to the sharing space.

For example, the first information communication apparatus may further include a third storage which stores an address book including one or more telephone numbers, and the first identification information may be information included in the address book.

With this, the first user can select the second user with whom content is shared, with a simple operation in which a user is selected from the existing address book.

For example, the first identification information may be a phone number, an e-mail address, a short message service (SMS) address, or social networking service (SNS) account information of the second user.

With this, it is possible to specify the second user with whom content is shared, using the pre-registered information.

For example, the sharing space generating unit may generate a plurality of the sharing spaces in the first storage, and store in the first storage the first identification information corresponding to each of the sharing spaces, the connection request message may include sharing space specifying information for specifying a destination sharing space, and the connection control unit may allow the second information communication apparatus to access the destination sharing space when the second identification information included in the connection request message matches the first identification information corresponding to the destination sharing space specified from among the sharing spaces, and prohibit the second information connection device from accessing the destination sharing space when the second identification information fails to match the first identification information.

With this, the second information communication apparatus can select an intended sharing space even when plural sharing spaces exist.

For example, the second information communication apparatus may further include: a display unit which displays a sharing space list of the sharing spaces generated on request of the first information communication device; and an input receiving unit which obtains information indicating a sharing space selected from the sharing space list by the second user, and the destination sharing space may be the sharing space indicated by the obtained information.

With this, the second information communication apparatus can select an intended sharing space when the first user has plural sharing spaces.

Furthermore, a content sharing method according to an aspect of the present invention is a content sharing method using a server, a first information communication apparatus, and a second information communication apparatus, for sharing content between a first user using the first information communication apparatus and a second user using the second information communication apparatus, using a sharing space which is a storage area on the server, the content sharing method including: sending from the first information communication apparatus to the server a reserve request message for requesting to reserve the sharing space to be newly generated, the reserve request message including first identification information for identifying the second information communication apparatus or the second user; upon receiving the reserve request message, generating the sharing space in a first storage of the server, and storing in the first storage the first identification information included in the reserve request message, using the server; sending from the second information communication apparatus to the server a connection request message including second identification information for identifying the second information communication apparatus or the second user; and allowing the second information communication apparatus to access the sharing space when the second identification information included in the connection request message matches the first identification information stored in the first storage, and prohibiting the second information communication apparatus from accessing the sharing space when the second identification information fails to match the first identification information, using the server.

With this, it is possible to share the content between the first information communication apparatus and the second information communication apparatus in a simple way that (i) the first information communication apparatus sends to the server the reserve request message including information for identifying the second information communication apparatus or the second user and (ii) the second information communication apparatus sends to the server the connection request message including information for identifying the second information communication apparatus or the second user. In this way, the content sharing system allows content to be shared among members participating in an event, with a simple operation.

Furthermore, an information communication apparatus according to an aspect of the present invention is an information communication apparatus used as a first information communication apparatus in a content sharing system including a server, the first information communication apparatus, and a second information communication apparatus, for sharing content between a first user using the first information communication apparatus and a second user using the second information communication apparatus, using a sharing space which is a storage area on the server, the information communication apparatus including a reserve requesting unit which sends to the server a reserve request message for requesting to reserve the sharing space to be newly generated, the reserve request message including first identification information for identifying the second information communication apparatus or the second user.

With this, it is possible to share the content between the first information communication apparatus and the second information communication apparatus in a simple way that the first information communication apparatus sends to the server the reserve request message including information for specifying the second information communication apparatus or the second user. In this way, the content sharing system allows content to be shared among members participating in an event, with a simple operation.

It is to be noted that these general and specific aspects may be implemented using a system, a method, an integrated circuit, a computer program, or a computer readable recording medium such as a CD-ROM, or any combination of systems, methods, integrated circuits, computer programs, or recording media.

EMBODIMENT

The following describes an exemplary embodiment of the present invention with reference to the drawings.

It is to be noted that the exemplary embodiment described below indicates a general or specific example. The numerical values, shapes, materials, structural elements, the arrangement and connection of the structural elements, steps, the processing order of the steps etc. shown in the following embodiment are mere examples, and therefore do not limit the scope of the Claims. In addition, among the structural elements in the following embodiment, structural elements not recited in any one of the independent claims are described as arbitrary structural elements.

In a content sharing system 100 according to the exemplary embodiment, a first information communication apparatus 110 sends to a server 130 a reserve request message including a phone number of another information communication apparatus with which a sharing space is shared. In this way, it is possible to share content with a simplified user operation.

(Outline of Content Sharing System 100)

Firstly, an outline of the content sharing system 100 according to the exemplary embodiment of the present invention will be described.

FIG. 1 is a diagram illustrating an outline of a content sharing system 100 according to the present invention. The content sharing system 100 includes a first information communication apparatus 110, plural second information communication apparatuses 120, and a server 130.

The first information communication apparatus 110 is used by a representative (a host user: the first user) of users who share content.

Each of the second information communication apparatus 120 is used by a user (a guest user: the second user) other than the host user with whom content is shared. It is to be noted that the number of second information communication apparatuses should be at least one, but in the following exemplary embodiment, the number of second information communication apparatuses is more than one.

The content sharing system 100 according to the exemplary embodiment is a system for sharing content between the host user and the guest users, using a sharing space 140 which is a storage area on the server 130. In the content sharing system 100, the host user requests, through the first information communication apparatus 110, the server 130 to reserve the sharing space for sharing content. At the same time, the host user sends to the server 130 contact information of the host user and all guest users who access the sharing space. The server 130 reserves the sharing space and registers, as authorized users, the host user and the guest users identified by the contact information.

In this way, the guest users can use their contact information as authentication information to access the sharing space on the server 130 without registering with the server 130 in advance through the second information communication apparatuses 120. In other words, the guest users can easily share content in the sharing space without a complicated operation.

In the exemplary embodiment, the first information communication apparatus 110 and the second information communication apparatuses 120 are implemented as smart phones, but any other apparatuses are possible. For example, the first and second information communication apparatuses may be digital cameras, tablet terminals, or others.

The server 130 manages content stored in the sharing space on the server 130, information of users who access the sharing space, and others. For example, the server 130 is implemented as a computer system including a general-purpose computer. The first information communication apparatus 110 and the second information communication apparatuses 120 access the server 130 via a network.

The sharing space is a storage area reserved on a storage device managed by the server 130.

Figure 2:
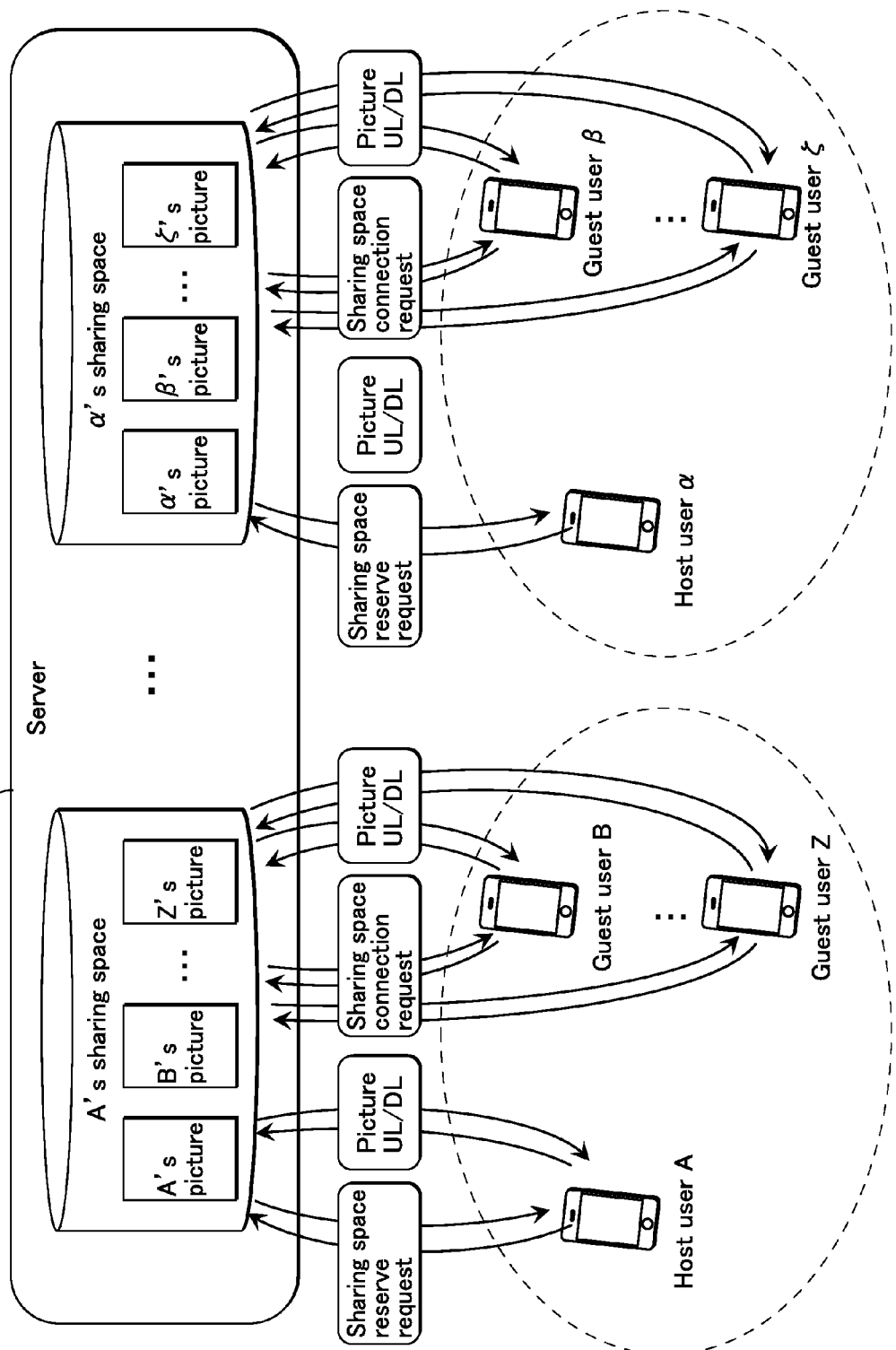
FIG. 2 is a summarized diagram illustrating operation of a content sharing system according to the exemplary embodiment.

FIG. 2 is a diagram illustrating an outline of the content sharing system 100.

Firstly, the host user requests, through the first information communication apparatus 110, the server 130 to reserve the sharing space. The server 130 reserves the sharing space and registers all users (the host user and the guest users) who share content.

Next, each of the guest users requests, through his her second information communication apparatus 120, the server 130 to connect to the sharing space.

After authentication, the host user and the guest users each access the sharing space on the server 130 to upload (UL) and download (CSL) content (such as pictures).

As shown in FIG. 2, the respective sharing spaces for host users are generated on the server 130. For each of the sharing spaces, the sharing space is shared between a host user who requests to reserve the sharing space and guest users who are specified by the host user.

(Configuration of Content Sharing System 100)

Figure 3:
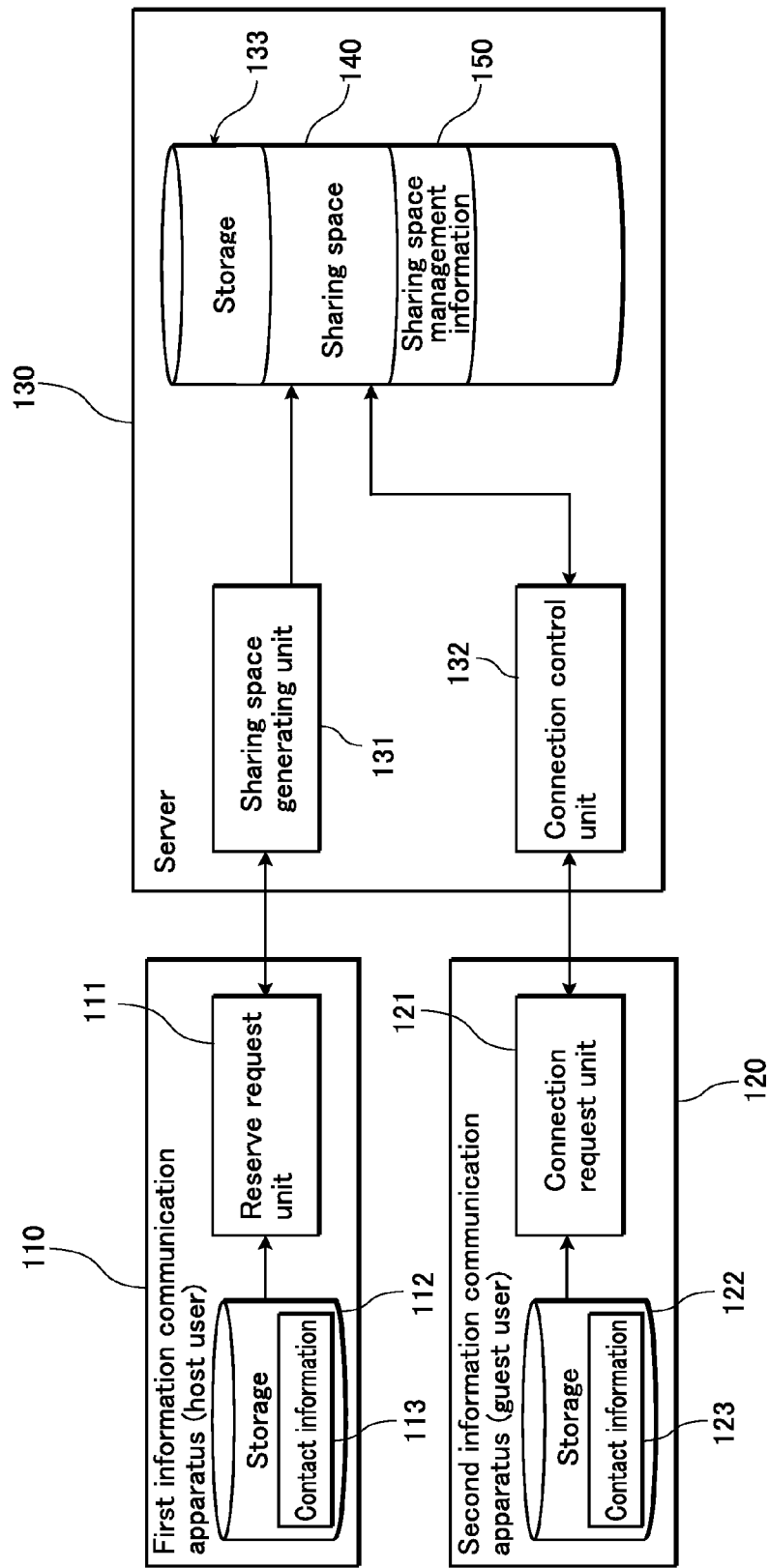
FIG. 3 is a diagram illustrating an example of a configuration of a content sharing system according to the exemplary embodiment.

Next, the configuration of the content sharing system 100 will be described, FIG. 3 is a diagram illustrating an exemplary configuration of the content sharing system 100.

Firstly, the configuration of the first information communication apparatus 110 will be described.

The first information communication apparatus 110 includes a reserve requesting unit 111 and a storage 112 (the third storage).

The storage 112 stores contact information on 113.

Figure 4:
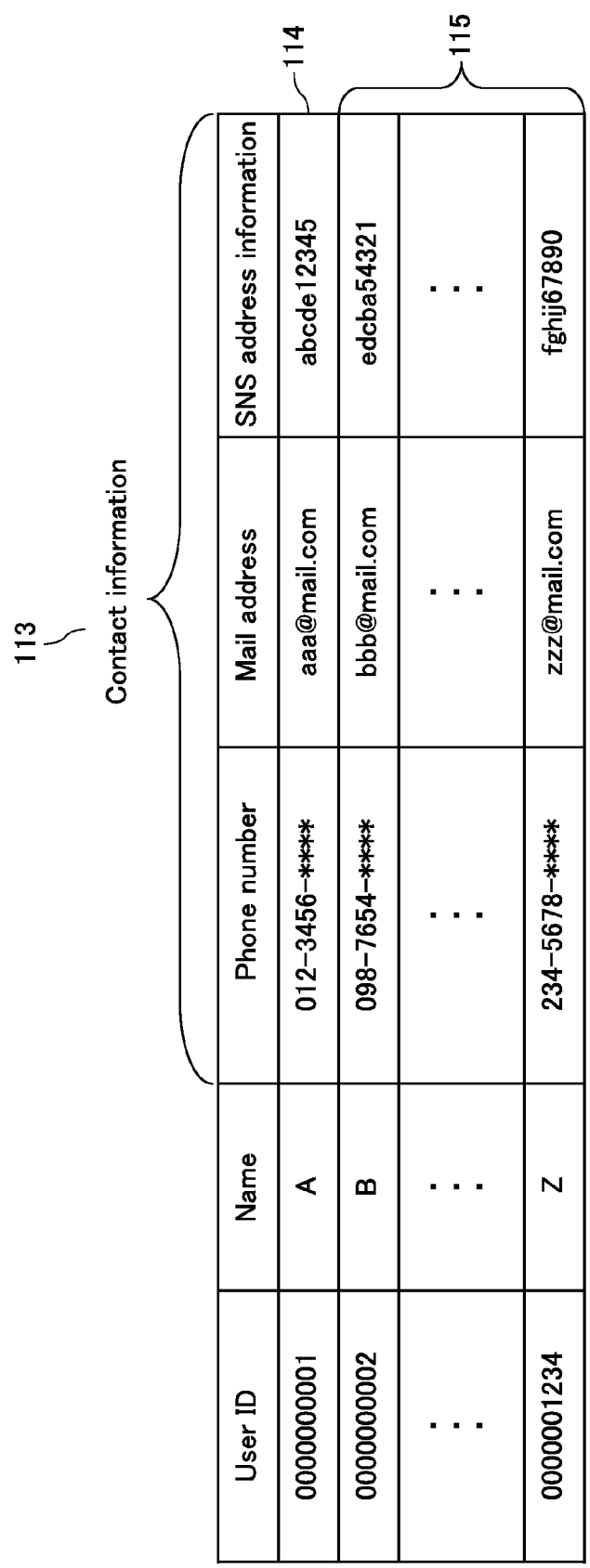
FIG. 4 is a diagram illustrating an example of contact information stored in an information communication apparatus according to the exemplary embodiment.

FIG. 4 is a diagram illustrating an example of the contact information 113 stored in the storage 112. The contact information 113 includes contact information 114 of its own apparatus (the first information communication apparatus 110) or the user of its own apparatus (the host user), and contact information 115 of other apparatuses (the second information communication apparatuses 120) or the users of other apparatuses (the guest users). For example, the storage 112 stores address book data including users' contact information (such as phone numbers). For example, the contact information 113 is information included in the address book.

In other words, the contact information 114 and the contact information 115 correspond to the first information communication apparatus 110 and the second information communication apparatuses 120, respectively. In the exemplary embodiment, the contact information is implemented as phone numbers of the first information communication apparatus 110 and the second information communication apparatuses 120. The contact information 114 and 115, however, may be e-mail addresses or SMS (short message service) addresses in the case where the first information communication apparatus 110 and the second information communication apparatuses 120 are implemented as mobile terminals such as smart phones. Alternatively, the contact information 114 and 115 may be SNS account information of users of the first information communication apparatus 110 and the second information communication apparatuses 120. In other words, the information corresponding to the first information communication apparatus 110 includes information corresponding to the user using the first information communication apparatus 110, and the information corresponding to the second information communication apparatuses 120 includes information corresponding to the users who use the respective second information communication apparatuses 120. More specifically, the contact information is identification information for identifying the first information communication apparatus 110 or the host user and the second information communication apparatuses 120 or the guest users.

The reserve requesting unit 111 creates a reserve request message for reserving a new sharing space, using the contact information 113 stored in the storage 112, and sends the created reserve request message to the server 130.

Figure 5:
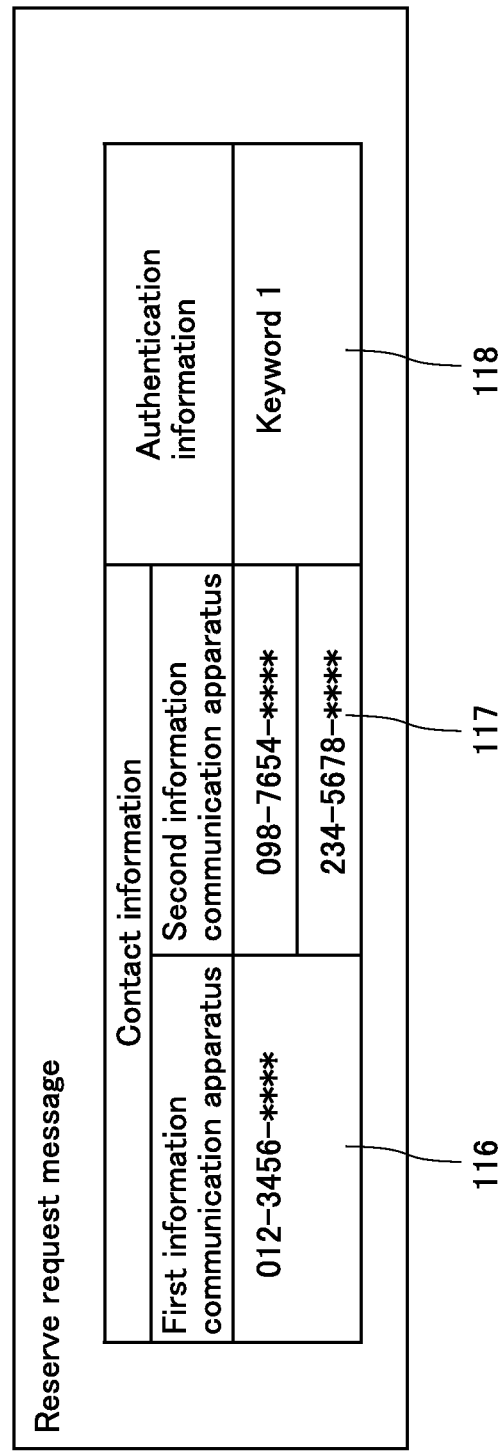
FIG. 5 is a diagram illustrating an example of a reserve request message according to the exemplary embodiment.

FIG. 5 is a diagram illustrating a structure of the reserve request message.

As shown in FIG. 5, the reserve request message includes the contact information 116 of the first information communication apparatus 110 and the contact information 117 of the second information communication apparatuses 120 (the first identification information), it is to be noted that the contact information 116 is identical to the contact information 114 stored in the storage 112. The reserve requesting unit 111 retrieves the contact information 114 from the storage 112, and creates the reserve request message including the retrieved contact information 114 as the contact information 116. The contact information 117 is a part of the contact information 115 stored in the storage 112, and relates to guest users selected by the host user.

It is to be noted that the reserve request message may further include at least one of information indicating the capacity of the sharing space (storage capacity) and information indicating the expiration date of the sharing space. Furthermore, as shown in FIG. 5, the reserve request message may also include authentication information 118 (the first authentication information) for authenticating the second information communication apparatus 120. For example, the authentication information 118 is a keyword predetermined by the host user and the guest users. It is to be noted that the authentication information 118 may be a picture (an image) of a particular object that is captured with the first information communication apparatus 110.

Upon receiving the reserve request message, the server 130 generates the sharing space 140 on the server 130. The reserve requesting unit 111 receives, from the server 130, sharing space connection information for accessing the sharing space 140 reserved on the server 130. The sharing space connection information includes sharing space address information.

The sharing space address information is used by the first information communication apparatus 110 and the second information communication apparatuses 120 for access to the sharing space. For example, the sharing space address information represents the uniform resource identifier (URI) of the sharing space. In the exemplary embodiment, the sharing space address information is implemented as the URL information of the sharing space, for example.

Figure 6:
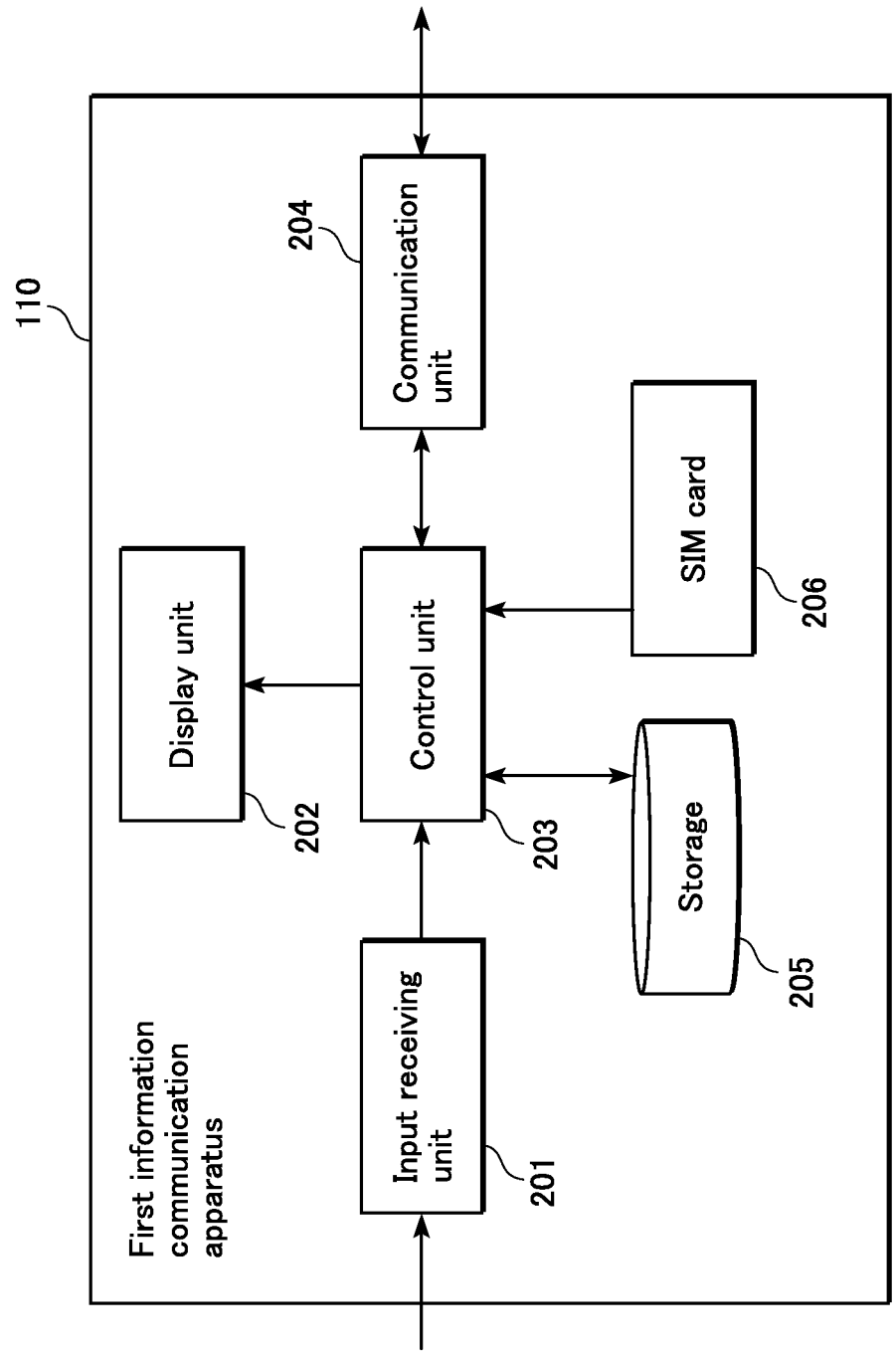
FIG. 6 is a diagram illustrating an example of the configuration of the information communication apparatus according to the exemplary embodiment.

FIG. 6 is a diagram illustrating an exemplary hardware configuration of the first information communication apparatus 110. As shown in FIG. 6, the first information communication apparatus 110 includes an input receiving unit 201 which is a user input interface for receiving an input of a user's operation, a display unit 202 which is a display such as a liquid crystal display, a control unit 203 such as a CPU, a communication unit 204 which is a communication interface and communicates with external devices, a storage 205, and a SIM (Subscriber Identity Module) card 206.

The storage 205 is a recordable medium such as a DRAM (Dynamic random access memory), a SDRAM (Synchronous dynamic random access memory), a flash memory, a ferroelectric memory, or a HDD (Hard disk drive). Alternatively, the storage 205 may be composed of different media.

The SIM card 206 has the function of restricting access to itself. In other words, the access from the first information communication apparatus 110 to data stored in the SIM card 206 (rewrite and readout) is restricted.

The storage 112 in which the contact information 113 is stored is achieved by at least one of the storage 205 and the SIM card 206, for example. It is to be noted that the contact information 114 of the first information communication apparatus 110 and the contact information 115 of the second information communication apparatus 120 may be separately stored in different areas or media. For example, the contact information 114 may be stored in the SIM card 206, and the contact information 115 may be stored in a normal memory without the function of restricting access (the storage 205).

The functionality of the reserve requesting unit 111 is achieved by the input receiving unit 201, the control unit 203, and the communication unit 204.

The foregoing has been described the configuration of the first information communication apparatus 110 according to the exemplary embodiment.

Next, the configuration of the second information communication apparatus 120 will be described.

The second information communication apparatus 120 includes a connection requesting unit 121 and a storage 122 (the second storage).

The storage 122 stores contact information 123 including the contact information of the first information communication apparatus 110 or the host user and the contact information of the second information communication apparatus 120 or the user using the second information communication apparatus 120. It is to be noted that the stored information is the same as that in the storage 112, except for the specific details (values) of the stored information.

The connection requesting unit 121 creates a connection request message for connecting to the sharing space 140, using the contact information 123 stored in the storage 122, and sends the created connection request message to the server 130.

FIG. 7 is a diagram illustrating an example of the connection request message. As shown in FIG. 7, the connection request message includes the contact information 125 of the second information communication apparatus 120 (the second identification information) and the sharing space specifying information 124 for specifying a destination sharing space 140.

It is to be noted that in FIG. 7, the contact information of the first information communication apparatus 110 that has requested to generate the destination sharing space 140 is used as the sharing space specifying information 124, but any other information indicating the destination sharing space 140 may be used. For example, the sharing space specifying information 124 may be the ID of the destination sharing space 140.

Furthermore, as shown in FIG. 7, the connection request message may also include authentication information 126 (the second authentication information) for authenticating the second information communication apparatus 120. The authentication information 126 corresponds to the authentication information 118 included in the reserve request message as described above. For example, the authentication information 126 is a keyword predetermined by the host user and the guest users, or a picture (an image) of a particular object that is captured with the second information communication apparatus 120.

Upon receiving the sharing space connection request message, the server 130 authenticates a connection to the specified sharing space on the server 130. The connection requesting unit 121 receives, from the server 130, the sharing space connection information for accessing the sharing space reserved on the server 130.

The details of the sharing space connection information are the same as those of the first information communication apparatus 110. Furthermore, the hardware configuration of the second information communication apparatus 120 is the same as that of the first information communication apparatus 110 as shown in FIG. 6, for example. Furthermore, the exemplary configuration of the storage 122 is the same as that of the storage 112. In other words, the storage 122 in which the contact information 123 is stored is achieved by at least one of the storage 205 and the SIM card 206, for example. It is to be noted that the contact information of the first information communication apparatus 110 and the contact information of the second information communication apparatus 120 may be separately stored in different areas or media. For example, the contact information 114 of the second information communication apparatus 120 (its own apparatus) may be stored in a memory (a SIM card 206) to which access (rewrite and readout) from the second information communication apparatus 120 is restricted, and the contact information of the first information communication apparatus 110 (another apparatus) may be stored in a normal memory (the storage 205) without the function of restricting access. In other words, the connection requesting unit 121 may retrieve the identification information of the second information communication apparatus 120 from the storage 122 and send to the server 130 the connection request message including the retrieved identification information.

The functionality of the connection requesting unit 121 is achieved by the input receiving unit 201, the control unit 203, and the communication unit 204.

The foregoing has been described the configuration of the second information communication apparatus 120 according to the exemplary embodiment.

Next, the configuration of the server 130 will be described.

The server 130 includes a sharing space generating unit 131, a storage 133 (the first storage), and a connection control unit 132.

Upon receiving the reserve request message from the first information communication apparatus 110, the sharing space generating unit 131 generates the sharing space 140 in the storage 133. The sharing space generating unit 131 also generates sharing space management information 150 which is information related to the sharing space 140, and stores the generated sharing space management information 150 in the storage 133. The sharing space generating unit 131 also generates plural sharing spaces in the storage 133 in response to plural reserve request messages, and stores, in the storage 133, the sharing space management information 150 corresponding to each of the sharing spaces.

FIG. 8 is a diagram illustrating an example of the sharing space management information 150 according to the exemplary embodiment. The sharing space management information 150 includes, for each of the sharing spaces 140, a sharing space ID 141 indicating the ID of the sharing space 140, sharing space address information 142 which is the address of the sharing space 140, contact information 143 for identifying information communication apparatuses or users authorized to the sharing space 140, and authentication information 146 for accessing the sharing space 140. The contact information 143 includes contact information 144 for identifying the first information communication apparatuses 110 or the host users authorized to access the sharing space 140, and contact information 145 for identifying the second information communication apparatuses 120 or the guest users authorized to access the sharing space 140.

More specifically, the sharing space generating unit 131 sets the sharing space ID 141 and the sharing space address information 142 to the ID and the address of the generated sharing space 140, respectively. The sharing space generating unit 131 also sets the contact information 144, the contact information 145, and the authentication information 146 to the contact information 116 of the first information communication apparatus 110, the contact information 117 of the second information communication apparatuses 120, and the authentication information 118, respectively.

The sharing space generating unit 131 also creates the sharing space connection information indicating the sharing space address information 142 of the generated sharing space 140 and sends the created sharing space connection information to the first information communication apparatus 110.

Upon receiving the connection request message from the second information communication apparatus 120, the connection control unit 132 authenticates the second information communication apparatus 120. As an example of the authentication process, the connection control unit 132 retrieves the sharing space management information 150 from the storage 133 and checks whether or not the contact information 125 of the second information communication apparatus 120 in the connection request message is included in the contact information 145 of the second information communication apparatuses 120 for the sharing space 140 specified by the sharing space specifying information 124 in the connection request message. When the contact information 125 is included in the contact information 145, the connection control unit 132 determines that the second information communication apparatus 120 is accessible, and sends to the second information communication apparatus 120 the sharing space connection information indicating the address of the sharing space 140.

In this way, the connection control unit 132 allows the second information communication apparatus 120 to access the destination sharing space 140 when the contact information 125 (the second identification information) included in the connection request message matches the contact information 145 (the first identification information) corresponding to the destination sharing space 140, which is stored in the storage 133, and prohibits the second information communication apparatus 120 from accessing the destination sharing space 140 when the contact information 125 fails to match the contact information 145.

Furthermore, in the case where the authentication information is used, the connection control unit 132 allows the second information communication apparatus 120 to access the sharing space 140 when (i) the contact information 125 matches the contact information 145 and (ii) the authentication information 126 (the second authentication information) included in the connection request message matches the authentication information 146 (the first authentication information) corresponding to the destination sharing space 140, which is stored in the storage 133, and prohibits the second information communication apparatus 120 from accessing the destination sharing space 140 when the authentication information 126 fails to match the authentication information 146.

Furthermore, in the case where the authentication information is a keyword, the connection control unit 132 determines that two authentication information items are matched, for example, when a keyword indicated by one of the two authentication information items is identical to that indicated by the other. Furthermore, in the case where the authentication information is an image, the connection control unit 132 determines that two authentication information items are matched, for example, when the same object is included in the two images. In other words, when it is determined that two authentication information items are matched, the two authentication information items need not be completely identical. The case where there is a predetermined relation between the two authentication information items is also included.

The storage 133 is a storage device (storage area) included in the server 130, and the sharing space 140 is generated in the storage 133. The sharing space 140 stores content uploaded from the first information communication apparatus 110 and the second information communication apparatuses 120. The storage 133 also stores the sharing space management information 150. The storage 133 is a storage device such as a hard drive. It is to be noted that the storage 133 is a storage device included in the server 130 in the exemplary embodiment, but may be a storage device connected to the server 130 via an interface such as USB (Universal Serial Bus). Alternatively, the storage 133 may be a storage device connected to the server 130 via a network. Alternatively, the storage 133 may be a combination of them. Furthermore, the sharing space management information 150 may be stored in a storage device different from the sharing space 140.

It is to be noted that the segmentation of the processing unit (functional block) included in each apparatus is an example. It is possible to implement plural functional blocks as a single functional block, to divide a single functional block into plural functional blocks, or to move a part of the functionality to another functional block. Furthermore, the functionality of plural functional blocks having similar functionality may be performed in parallel or in time division by a single hardware or software.

For example, the server 130 may include a sharing space management unit interposed between the storage 133 and the sharing space generating unit 131 and the connection control unit 132. The sharing space management unit manages the sharing space 140 to input and output content or for other purposes (for example, to create the sharing space 140, and to read and write the sharing space management information 150). The sharing space management unit also manages the sharing space 140 in accordance with an instruction from the sharing space generating unit 131 and the connection control unit 132.

In this way, the first information communication apparatus 110 reserves the sharing space 140 for sharing content on the server 130 and registers with the server 130 the contact information of the second information communication apparatuses 120 used by guest users who want to share content, by accessing the server 130. This allows each of the second information communication apparatuses 120 to access the sharing space 140 by using its own contact information as the authentication information without accessing the server 130 in advance. Thus, in the exemplary embodiment, it is possible to easily access the sharing space on the server 130 without a complicated user operation.

(Overall Operation of Content Sharing System)

Next, the overall operation of the content sharing system 100 will be described.

Figure 9:
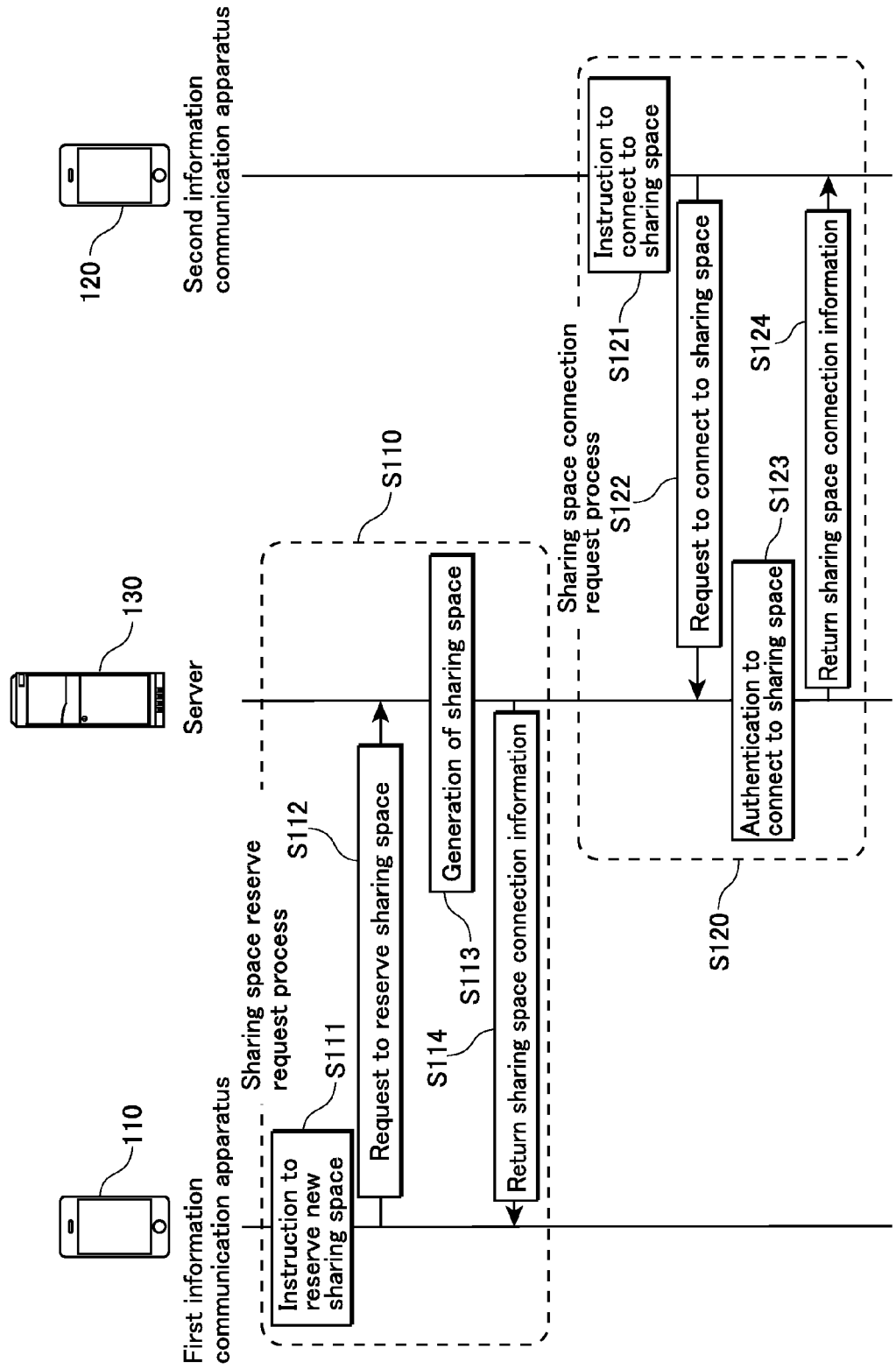
FIG. 9 is a diagram illustrating a sequence of actions of the whole content sharing system according to the exemplary embodiment.

FIG. 9 is a diagram illustrating a sequence of actions of the whole content sharing system 100.

In the content sharing system 100, firstly, the first information communication apparatus 110 requests the server 130 to reserve the sharing space (S110). Next, the second information communication apparatus 120 requests the server 130 to connect to the sharing space, and obtains the authentication (S120).

More specifically, in a sharing space reserve request process (S110), the host user gives an instruction to reserve a new sharing space (S111), the first information communication apparatus 110 requests the server 130 to reserve the sharing space (S112), the server 130 reserves the sharing space (S113), and the server 130 transmits the sharing space connection information to the first information communication apparatus 110 (S114). In a sharing space connection request process (S120), the guest user gives an instruction to connect to the sharing space (S121), the second information communication apparatus 120 requests the server 130 to connect to the sharing space (S122), the server 130 authenticates the second information communication apparatus 120 to connect to the sharing space (S123), and the server 130 transmits the sharing space connection information to the second information communication apparatus 120 (S124).

The following describes the sharing space reserve request process (S110) and the sharing space connection request process (S120) in detail.

(Sharing Space Reserve Request Process)

Firstly, the sharing space reserve request process (S110) will be described. The sharing space reserve request process includes a process in the first information communication apparatus 110 and a process in the server 130. Initially, the process in the first information communication apparatus 110 will be described.

Figure 10:
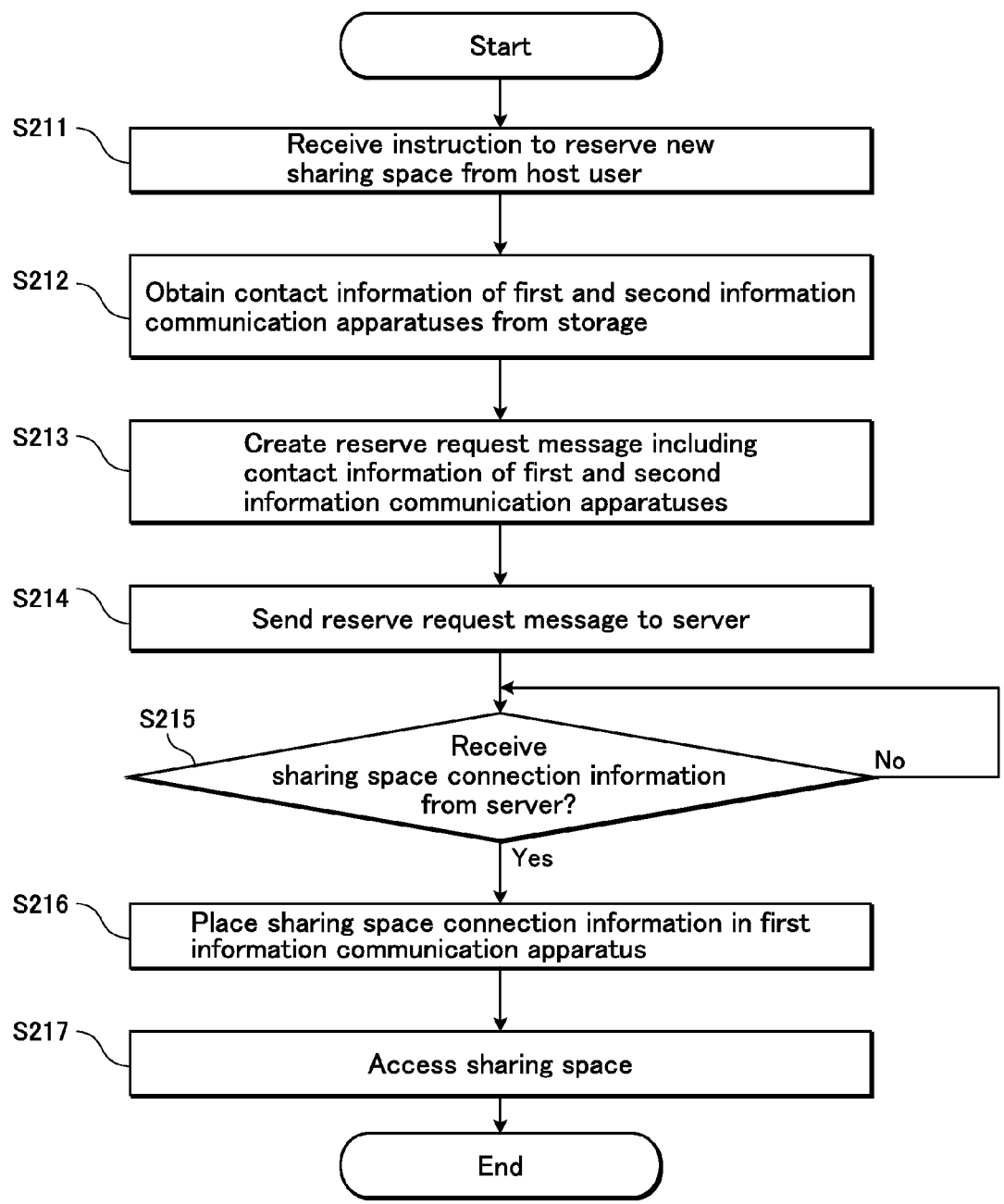
FIG. 10 is a flowchart illustrating a sharing space reserve request process in a first information communication apparatus according to the exemplary embodiment.

FIG. 10 is a flowchart of the sharing space reserve request process in the first information communication apparatus 110 according to the exemplary embodiment.

Figure 11C:
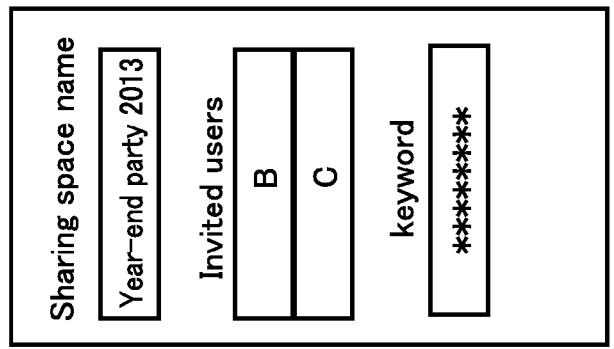
FIG. 11C is a diagram illustrating an example of the display screen according to the exemplary embodiment.
Figure 11B:
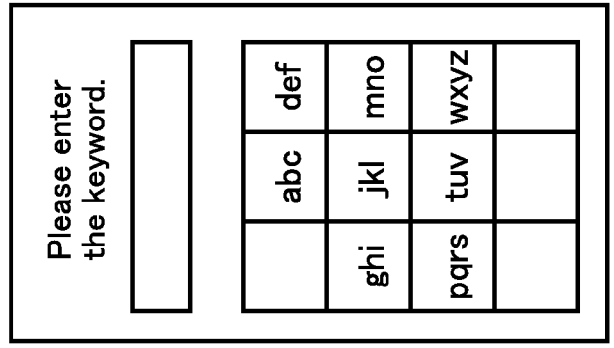
FIG. 11B is a diagram illustrating an example of the display screen according to the exemplary embodiment.
Figure 11A:
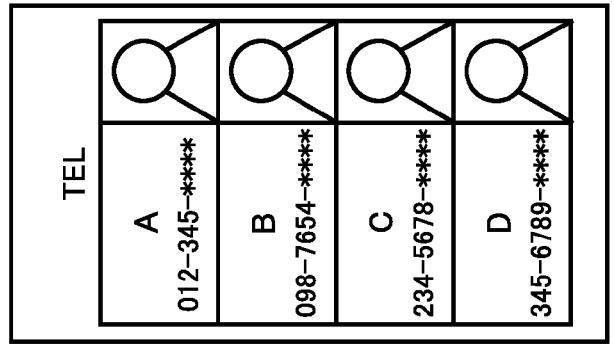
FIG. 11A is a diagram illustrating an example of a display screen according to the exemplary embodiment.

Firstly, the reserve requesting unit 111 receives, from the host user, an instruction to reserve a new sharing space (S211). For example, this instruction is received by the input receiving unit 201 as shown in FIG. 6, FIG. 11A to FIG. 11C are diagrams illustrating examples of a screen appeared on the display unit 202 when an instruction is received. As shown in FIG. 11A, the host user selects guest users with whom the sharing space is shared, from among users listed on an address book. Then, as shown in FIG. 11B, the host user enters the keyword used as the authentication information. Then, as shown in FIG. 11C, the host user enters, for example, the sharing space name as information for identifying the sharing space.

Figure 12B:
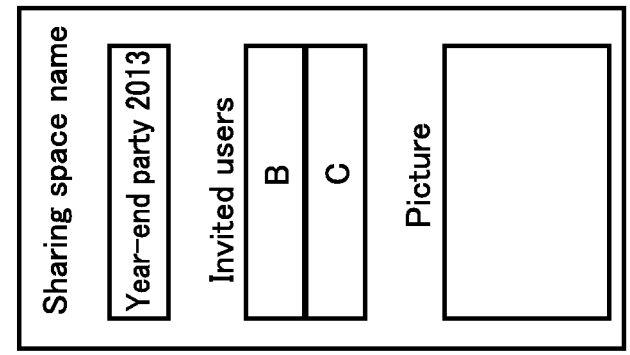
FIG. 12B is a diagram illustrating an example of the display screen according to the exemplary embodiment.
Figure 12A:
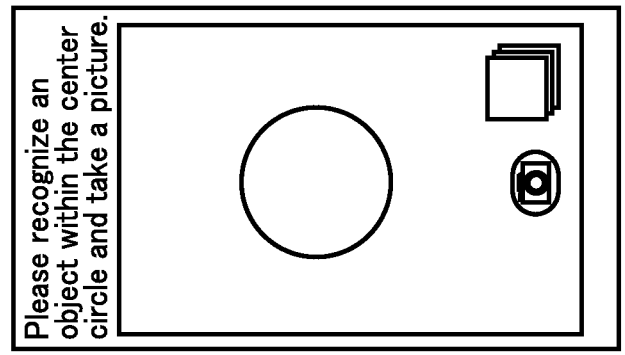
FIG. 12A is a diagram illustrating an example of the display screen according to the exemplary embodiment.

In the case where a picture (image) of a particular object is used as the authentication information, as shown in FIG. 12A and FIG. 12B, the host user captures the object used as the authentication information.

Next, the reserve requesting unit 111 obtains, from the storage 112, the contact information 114 of the first information communication apparatus 110 and the contact information 115 of the second information communication apparatuses 120 used by the guest users selected by the host user (S212). Next, the reserve requesting unit 111 creates the reserve request message including the obtained contact information 114 of the first information communication apparatus 110 and the obtained contact information 115 of the second information communication apparatuses 120 (116 and 117), the authentication information 118 specified by the host user (the keyword or image), and the information for identifying the sharing space (for example, a sharing space name) (S123). It is to be noted that the authentication information 118 and the information for identifying the sharing space need not be included in the reserve request message.

In the case where the storage 112 has the function of restricting access to itself as described above, it is possible to prevent tampering with the contact information 114 (116) of the first information communication apparatus 110.

Next, the reserve requesting unit 111 sends the reserve request message to the server 130 (S214), and waits for a response from the server 130, i.e. the sharing space connection information (S215). Upon receiving the sharing space connection information from the server 130, the reserve requesting unit 111 places the sharing space 140 address (URI) included in the sharing space connection information, in the first information communication apparatus 110 to access the sharing space 140 (S216).

After this, the first information communication apparatus 110 accesses the sharing space 140 (uploads and downloads content) using the placed address of the sharing space 140 (S217).

It is to be noted that the contact information is a phone number in the exemplary embodiment. Thus, it is possible to easily reserve the sharing space 140 among users whose contact information is pre-stored in both the first information communication apparatus 110 and each of the second information communication apparatuses 120.

Next, the process in the server 130 will be described.

Figure 13:
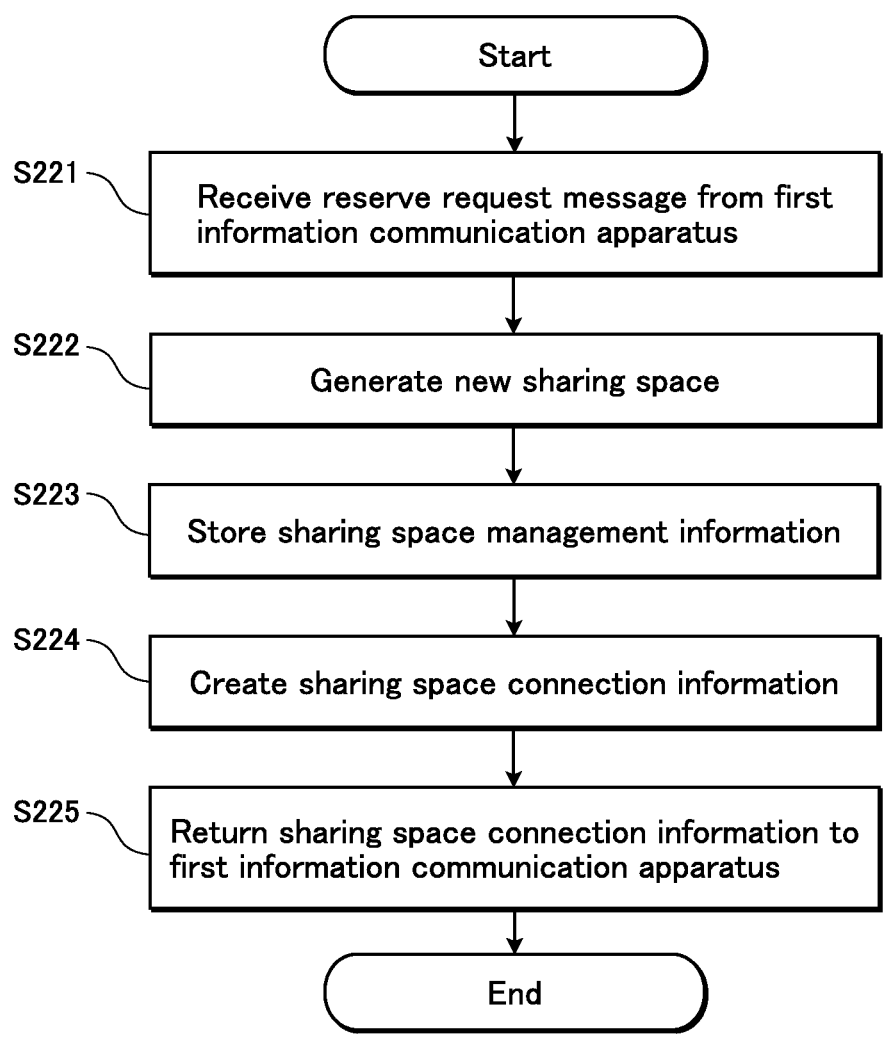
FIG. 13 is a flowchart illustrating a sharing space reserve request process in a server according to the exemplary embodiment.

FIG. 13 is a flowchart of the sharing space reserve request process in the server 130 according to the exemplary embodiment.

Firstly, upon receiving the reserve request message from the first information communication apparatus 110 (S221), the sharing space generating unit 131 generates the sharing space 140 in the storage 133 (S222).

It is to be noted that the reserve request message may include at least one of the information specifying the capacity of the sharing space (storage capacity) and the information specifying the expiration date of the sharing space, as described above. In this case, the server 130 creates the sharing space having the specified capacity or the specified expiration date.

Then, the sharing space generating unit 131 stores, in the storage 133, the sharing space management information 150 including the sharing space ID 141 indicating the ID of the generated sharing space 140, the sharing space address information 142 indicating the address of the generated sharing space 140, and the contact information 144 and 145 and authentication information 146 which are, respectively, the contact information 116 and 117 and the authentication information 118 included in the reserve request message (S223).

It is to be noted that the sharing space 140 and the sharing space management information 150 are generated and stored so as not to overlap existing sharing spaces and sharing space management information in the server 130.

Next, the sharing space generating unit 131 obtains the sharing space address information 142 included in the sharing space management information 150 and creates the sharing space connection information including the sharing space address information 142 (S224). Finally, the sharing space generating unit 131 transmits the sharing space connection information to the first information communication apparatus 110 (S225).

It is to be noted that the process sequence of Steps S221 to S225 is an example, and any other sequence is possible. Alternatively, plural steps may be performed in parallel.

As described above, in the case where the sharing space management unit is provided, the sharing space management unit generates the sharing space 140, stores the sharing space management information 150, and performs other processing in accordance with an instruction from the sharing space generating unit 131.

(Sharing Space Connection Request Process)

Next, the sharing space connection request process (S120) will be described. The sharing space connection request process includes a process in the second information communication apparatus 120 and a process in the server 130, initially, the process in the second information communication apparatus 120 will be described.

Figure 14:
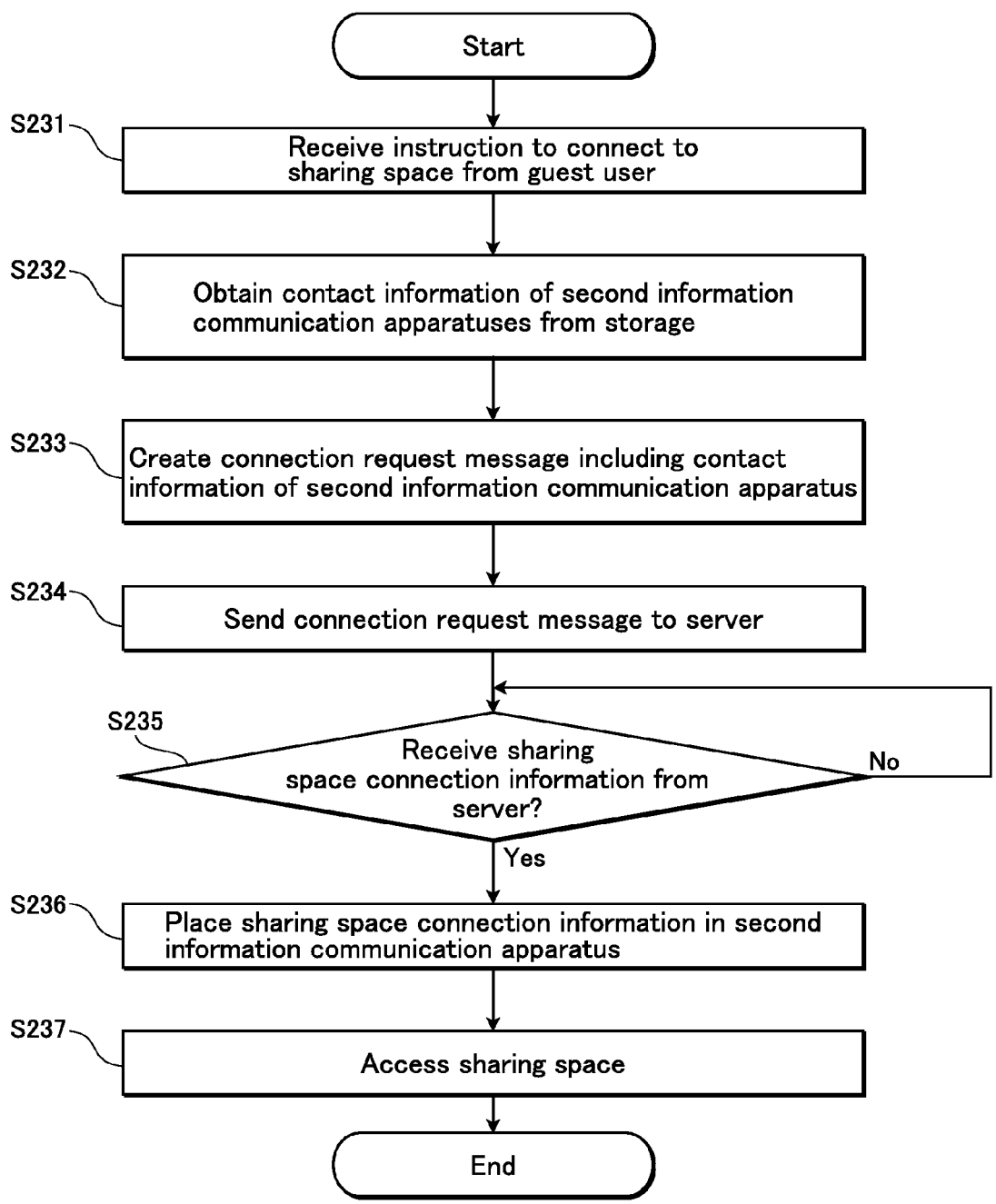
FIG. 14 is a flowchart illustrating a sharing space connection request process in a second information communication apparatus according to the exemplary embodiment.

FIG. 14 is a flowchart of the sharing space connection request process in the second information communication apparatus 120.

Firstly, the connection requesting unit 121 receives, from the guest user, an instruction to connect to the sharing space (S231). For example, this instruction is received by the input receiving unit 201 as shown in FIG. 6. As shown in FIG. 11A, the guest user selects the host user who has requested to generate the sharing space 140, from among users listed on an address book. Then, as shown in FIG. 11B, the guest user enters the keyword used as the authentication information. In the case where a picture (image) of a particular object is used as the authentication information, as shown in FIG. 12A, the guest user captures the object used as the authentication information. For example, this object is the same as the object captured by the host user.

Next, the connection requesting unit 121 obtains, from the storage 122, the contact information of the second information communication apparatus 120 and the contact information of the first information communication apparatus 110 used by the host user specified by the guest user (S232). Next, the connection requesting unit 121 creates the connection request message including the obtained contact information of the first information communication apparatus 110 (the sharing space specifying information 124), the obtained contact information 125 of the second information communication apparatus 120, and the authentication information 126 specified by the guest user (the keyword or image) (S233).

It is to be noted that the contact information of the host user who has requested to generate the sharing space 140 is used as the sharing space specifying information 124 for identifying the sharing space, but any other information may be used. For example, the sharing space name named by the host user, the ID, or the address may be used as the sharing space specifying information 124. Alternatively, some of these may be used as the sharing space specifying information 124. The authentication information 126 and the sharing space specifying information 124 need not be included in the connection request message. In the case where the sharing space specifying information 124 is not included in the connection request message, the server 130 should determine that one of the sharing spaces having the contact information of the second information communication apparatus 120 included in the connection request message is the sharing space to be connected.

In the case where the storage 122 has the function of restricting access to itself as described above, it is possible to prevent tampering with the contact information of the second information communication apparatus 120.

Next, the connection requesting unit 121 sends the connection request message to the server 130 (S234), and waits for a response from the server 130, i.e. the sharing space connection information (S235). Upon receiving the sharing space connection information from the server 130, the connection requesting unit 121 places the sharing space 140 address (URI) included in the sharing space connection information, in the second information communication apparatus 120 to access the sharing space 140 (S236).

After this, the second information communication apparatus 120 accesses the sharing space 140 (uploads and downloads content) using the placed address of the sharing space 140 (S237).

It is to be noted that the second information communication apparatus 120 may be authenticated only when requesting the first connection, or may be authenticated for every access. The authentication process during each access after the first connection may be the same as that during the first connection, or may include only a part of the authentication process during the first connection.

In a similar manner, the first information communication apparatus 110 may be authenticated when accessing the sharing space 140. The authentication process for the first information communication apparatus 110 is similar to the case where the second information communication apparatus 120 is replaced with the first information communication apparatus 110 in the description of the authentication process for the second information communication apparatus 120, for example.

Next, the process in the server 130 will be described.

Figure 15:
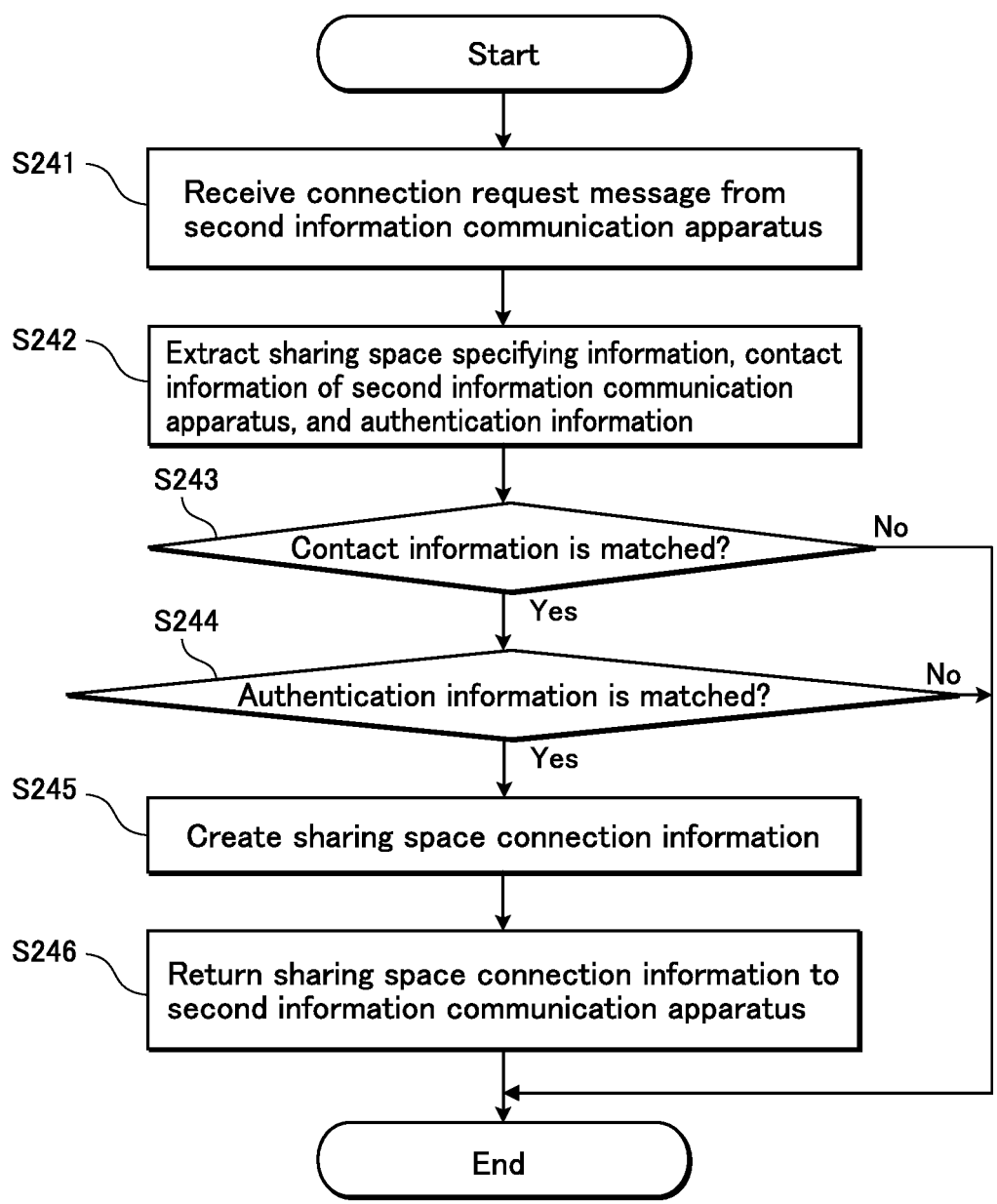
FIG. 15 is a flowchart illustrating a sharing space connection request process in the server according to the exemplary embodiment.

FIG. 15 is a flowchart of the sharing space connection request process in the server 130 according to the exemplary embodiment.

Firstly, the connection control unit 132 receives the connection request message from the second information communication apparatus 120 (S241), and extracts the sharing space specifying information 124, the contact information 125 of the second information communication apparatus 120, and the authentication information 126, included in the connection request message (S242). Next, the connection control unit 132 authenticates the second information communication apparatus 120 to connect to the sharing space (S243 and S244).

More specifically, the connection control unit 132 reads out the contact information 145 of the second information communication apparatuses 120 from the sharing space management information 150 for the destination sharing space specified by the sharing space specifying information 124, and checks whether or not the read contact information 145 includes the contact information 125 extracted in Step S242 (S243). The connection control unit 132 also reads out the authentication information 146 from the sharing space management information 150 for the destination sharing space specified by the sharing space specifying information 124, and checks whether or not the read authentication information 146 and the authentication information 126 extracted in Step S242 are matched (S244). It is to be noted that Steps S243 and S244 may be performed in any sequence or simultaneously.

Then, the connection control unit 132 determines that the second information communication apparatus 120 can access the sharing space 140 when the contact information 125 is included in the contact information 145 and the authentication information 146 and the authentication information 126 are matched (Yes in Step S243 and Yes in Step S244).

As described above, the connection control unit 132 performs the authentication process using both the contact information of the second information communication apparatus 120 and the authentication information. In this way, it is possible to prevent others from masquerading as the second information communication apparatus 120. It is to be noted that the connection control unit 132 may perform the authentication process using only the contact information of the second information communication apparatus 120 without the authentication information. In this case, the authentication information need not be included in each of the messages, the sharing space management information 150, or others.

The connection control unit 132 may also perform the authentication process using the contact information of the first information communication apparatus 110. For example, in the case where (i) the connection request message does not include the sharing space specifying information 124 or (ii) information other than the contact information of the first information communication apparatus 110 is used as the sharing space specifying information 124, the connection request message includes the contact information of the first information communication apparatus 110 as the authentication information 126. Then, the connection control unit 132 performs the authentication process using both the contact information of the first information communication apparatus 110 and the contact information of the second information communication apparatus 120. In this way, the second information communication apparatus 120 can access the sharing space 140 only when the second information communication apparatus 120 has the contact information of the first information communication apparatus 110. It is to be noted that the authentication process may use two or more of the following: the keyword; the image; and the contact information of the first information communication apparatus 110, as described above.

Next, the connection control unit 132 obtains the sharing space address information 142 included in the sharing space management information 150, and creates the sharing space connection information including the obtained sharing space address information 142 (S245). Finally, the connection control unit 132 transmits the sharing space connection information to the second information communication apparatus 120 (S246).

It is to be noted that the process sequence of Steps S241 to S246 is an example, and any other sequence is possible. Alternatively, the plural steps may be performed in parallel.

As described above, in the case where the sharing space management unit is provided, the sharing space management unit reads out, from the storage 133, the sharing space management information 150 and the sharing space address information 142, and performs other processing in accordance with an instruction from the connection control unit 132.

In the above description, a possible sharing space to be connected by the second information communication apparatus 120 can be identified. The following describes the operation of the content sharing system 100 in which there are plural possible sharing spaces to be connected by the second information communication apparatus 120.

Figure 16:
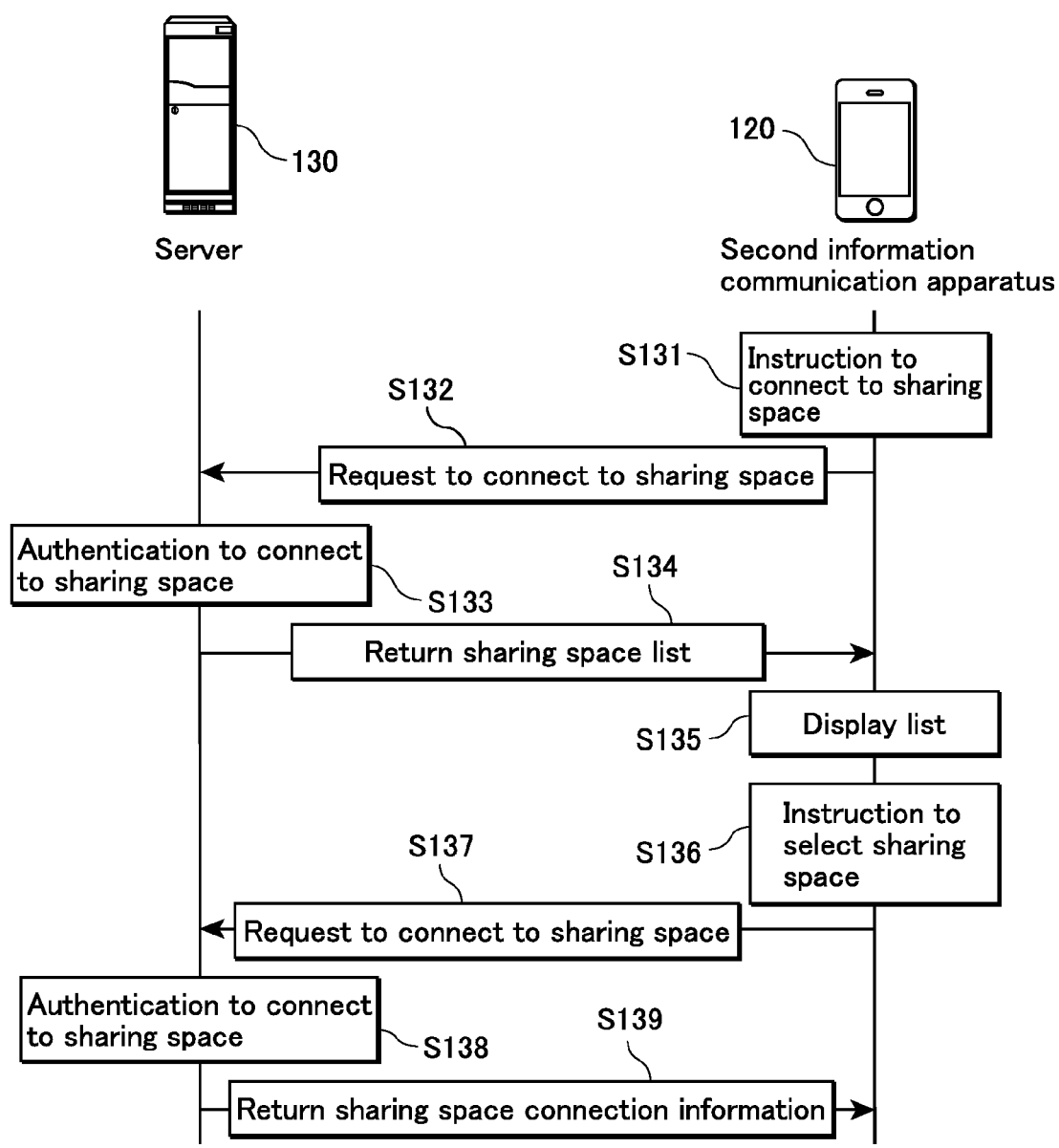
FIG. 16 is a diagram illustrating a sequence of actions of the content sharing system according to the exemplary embodiment.

FIG. 16 is a diagram illustrating the operation of the content sharing system 100 under this condition. In the following description, however, as an example, plural sharing spaces 140 have been generated on request of the host user, and the contact information of the first information communication apparatus 110 is used as the sharing space specifying information 124 included in the connection request message.

Firstly, the guest user gives an instruction to connect to a sharing space (S131), and the second information communication apparatus 120 sends to the server 130 the connection request message for requesting to connect to the sharing space (S132).

Next, the server 130 authenticates the second information communication apparatus 120 to connect to the sharing space (S133). The connection control unit 132 in the server 130 identifies, from among multiple sharing spaces in the storage 133, sharing spaces generated on request of the host user (the first information communication apparatus 110). More specifically, the connection control unit 132 identifies the sharing spaces in which the contact information 144 of the first information communication apparatus 110 included in the sharing space management information 150 matches the contact information indicated by the sharing space specifying information 124, in this way, the plural sharing spaces generated on request of the host user are extracted.

It is to be noted that in the case where the number of sharing spaces generated on request of the host user is one, the operation is the same as that in the foregoing embodiment.

Next, the connection control unit 132 transmits, to the second information communication apparatus 120, a sharing space list which is a list of the identified sharing spaces (S134).

Figure 17:
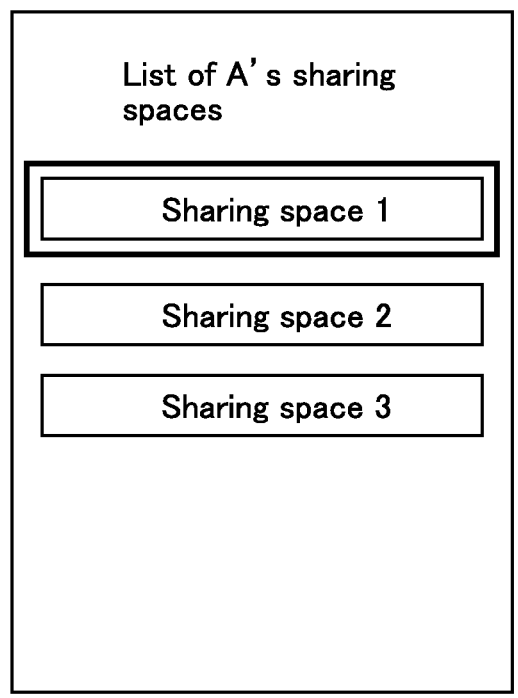
FIG. 17 is a diagram illustrating an example of the display screen according to the exemplary embodiment.

When the second information communication apparatus 120 receives the sharing space list, the display unit 202 displays the received sharing space list. FIG. 17 is a diagram illustrating an example of a screen displayed by the display unit 202. In FIG. 17, only the name of each sharing space is displayed, but at least one of the ID, generated date and time, updated date and time, information indicating the host user or the first information communication apparatus 110, and information indicating the guest user or the second information communication apparatus 120 may be displayed together with the name.

The guest user selects a destination sharing space from among the displayed sharing spaces, and the second information communication apparatus 120 (the input receiving unit 201) receives information indicating the sharing space selected by the guest user (S136). Next, the second information communication apparatus 120 sends to the server 130 the connection request message including the sharing space specifying information 124 indicating the sharing space selected by the guest user (S137). For example, the sharing space specifying information 124 is the ID or name of the selected sharing space.

Next, the server 130 authenticates the second information communication apparatus to connect to the destination sharing space indicated by the sharing space specifying information 124 included in the connection request message (S138), and the sharing space connection information is returned to the second information communication apparatus 120 (S139). It is to be noted that these processing details are the same as those in the foregoing embodiment.

Thus, even when the plural sharing spaces 140 have been generated on request of the host user and the contact information of the first information communication apparatus 110 is used as the sharing space specifying information 124 included in the connection request message, the guest user can access the intended sharing space 140.

In this description, as an example, plural sharing spaces 140 have been generated on request of the host user, and in the sending of the first connection request message (S132), the contact information of the first information communication apparatus 110 is used as the sharing space specifying information 124 included in the first connection request message. Even when, however, the destination sharing space 140 can not be identified, such as the case where the sharing space specifying information 124 is unavailable, the sharing space list may be transmitted in a similar manner to the foregoing. For example, in the case where the sharing space specifying information 124 is not included in the first connection request message in the sending of it (S132), a sharing space list of all sharing spaces generated on request of plural host users may be transmitted from the server 130 to the second information communication apparatus 120. It is to be noted that the sharing space list may comprise some of the all sharing spaces that have the contact information of the second information communication apparatus 120 included in the connection request message. Then, the guest user selects the destination sharing space 140 from the sharing space list, and the second information communication apparatus 120 sends to the server 130 again the second connection request message including the information indicating the selected sharing space 140 (S137).

In this description, as an example, a sharing space list is transmitted when (i) a connection to a sharing space is requested and (ii) the sharing space can not be identified, but the second information communication apparatus 120 may send a request message for transmitting the sharing space list, in advance.

As described above, in the content sharing system 100 according to the exemplary embodiment, while the first information communication apparatus 110 reserves the sharing space on the server 130, the contact information of all the second information communication apparatuses 120 with which content is to be shared is registered with the server 130. Thus, users can share content with a simple operation without registering user information with a predetermined server or service in advance. Furthermore, it is possible to reduce the throughput of each apparatus.

Other Modification

The present invention can be modified as below.

(1) Each of the aforementioned apparatuses can be implemented, specifically, as a computer system including a microprocessor, a ROM, a RAM, a hard disk unit, a display unit, a keyboard, a mouse, and so on. A computer program is stored in the RAM or hard disk unit. Each of the apparatuses achieves its function through the microprocessor's operation according to the computer program. Here, the computer program is configured by combining plural instruction codes indicating instructions for the computer in order to achieve predetermined functions.

(2) A part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the ROM. The System-LSI achieves its function through the microprocessor's operation of loading a computer program from the ROM to the RAM, and performing an operation such as computing according to the computer program which has been loaded.

(3) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and so on. The IC card or the module may also include the aforementioned super-multi-function LSI. The IC card or the module achieves its function through the microprocessor's operation according to the computer program. The IC card or the module may also be implemented to be tamper-resistant.

(4) The present invention may be implemented as the method described above. In addition, the present invention may be a computer program which causes a computer to execute these methods, and may also be a digital signal including the computer program.

In addition, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc), a semiconductor memory. In addition, the present invention may also include the above-described digital signal recorded in these recording media.

In addition, the present invention may also be realized by the transmission of the aforementioned computer program or digital signal via a telecommunication line, a wireless or wired communication line, a network represented by the Internet, a data broadcast and so on.

In addition, the present invention may also be a computer system including a microprocessor and a memory, in which the memory stores the aforementioned computer program and the microprocessor operates according to the computer program.

In addition, by transferring the program or the digital signal by recording onto the aforementioned recording media, or by transferring the program or digital signal via the aforementioned network and the like, implementation using another independent computer system is also made possible.

In each of the exemplary embodiments described above, each of the structural elements may be implemented as a dedicated hardware or by executing a software program appropriate to each structural element. The structural element may be implemented by causing a program execution unit, such as a CPU or a processor, to read out a software program stored in a recording medium, such as a hard disk or a semiconductor memory, and execute it.

Furthermore, the present invention may be the above program or a non-transitory computer-readable recoding medium storing the above program. In addition, it is obvious that the above program can be distributed via a transmitting medium such as an Internet.

(5) Each of the exemplary embodiments described above may be applied to each of the modifications described above.

In addition, all the above numbers are presented as examples for the sake of specific illustration, but any number is possible.

In addition, the segmentation of functional block in the block diagram is an example. It is possible to implement plural functional blocks as a single functional block, to divide a single functional block into plural functional blocks, or to move a part of functionality to another functional block. In addition, the functionality of plural functional blocks having similar functionality may be performed in parallel or in time division by a single hardware or software.

In addition, the sequence of steps in the above processing is presented as an example for the sake of specific illustration, but any other sequence is possible as long as a similar result is obtained. In addition, a part of the steps may be performed simultaneously (in parallel) with another step, Advantageous Effect The content sharing system according to an aspect of the present invention has been described based on the exemplary embodiment.

According to the present invention, while the first information communication apparatus reserves a sharing space on a server, contact information of all information communication apparatuses with which content is to be shared is registered with the server. Thus, users can share content with a simple operation without registering user information with a predetermined server or service in advance.

The content sharing system according to one or more aspects of the present invention has been described based on the exemplary embodiment, but the present invention is not limited to the exemplary embodiment or the modifications thereof. Other forms in which various modifications apparent to those skilled in the art are applied to the exemplary embodiment or the modifications thereof, or forms structured by combining elements of different embodiments and modifications thereof are included within the scope of the present invention, unless such changes and modifications depart from the scope of the present invention.

INDUSTRIAL APPLICABILITY

The present invention is applicable to a content sharing system. Furthermore, the present invention is useful as an information system in which content is shared between plural users.

REFERENCE SIGNS LIST

100 Content sharing system
110 First information communication apparatus
111 Reserve requesting unit
112, 122, 133, 205 Storage
113, 114, 115, 116, 117, 123, 125, 143, 144, 145 Contact information
118, 126, 146 Authentication information
120 Second information communication apparatus
121 Connection requesting unit
124 Sharing space specifying information
130 Server
131 Sharing space generating unit
132 Connection control unit
140 Sharing space
141 Sharing space ID
142 Sharing space address information
150 Sharing space management information
201 Input receiving unit
202 Display unit
203 Control unit
204 Communication unit
206 SIM card

The invention claimed is:
1. A content sharing system, comprising:
a server;
a first information communication apparatus; and
a second information communication apparatus, wherein content which is obtained in a place is shared in situ between a first user and a second user present in the place using a sharing space which is a storage area on the server, the first information communication apparatus operated by the first user, the second information communication apparatus operated by the second user, and the second user being different from the first user, the first information communication apparatus includes:

a first processor; and a first non-transitory computer-readable medium having stored thereon first executable instructions, which when executed by the first processor, cause the first information communication apparatus to:

display a screen that prompts the first user to capture a first object, present in the place, for authentication;

generate a first image by capturing the first object according to an operation by the first user on the screen; and send to the server a reserve request message for requesting to reserve the sharing space to be newly generated, the reserve request message including first identification information and the first image, the first identification information for identifying the second information communication apparatus or the second user;

the server includes:

a first storage;

a third processor; and a third non-transitory computer-readable medium having stored thereon third executable instructions, which when executed by the third processor, cause the server to:

generate, upon receiving the reserve request message, the sharing space in the first storage, and store in the first storage the first identification information and the first image included in the reserve request message;

the second information communication apparatus includes:

a second processor; and a second non-transitory computer-readable medium having stored thereon second executable instructions, which when executed by the second processor, cause the second information communication apparatus to:

display a screen that prompts the second user to capture, for authentication, a second object, present in the place, that is the same as the first object captured by the first information communication apparatus according to the operation by the first user;

generate a second image by capturing the second object according to an operation by the second user on the screen;

send to the server a connection request message including second identification information and the second image, the second identification information for identifying the second information communication apparatus or the second user; and the third executable instructions, when executed by the third processor, cause the server to further:

allow the second information communication apparatus to access the sharing space when it is determined by the server that (i) the second identification information included in the connection request message matches the first identification information stored in the first storage and that (ii) the second object in the second image included in the connection request message and the first object in the first image included in the first storage are the same object, and prohibit the second information communication apparatus from accessing the sharing space when it is determined by the server that (iii) the second identification information fails to match the first identification information and that (iv) the second object in the second image and the first object in the first image are not the same object.

2. The content sharing system according to claim 1, wherein the second information communication apparatus further includes a second storage which stores the second identification information and to which access is restricted, and the second executable instructions, when executed by the second processor, causes the second information communication apparatus to further retrieve the second identification information from the second storage, and send to the server the connection request message including the retrieved second identification information.

3. The content sharing system according to claim 2, wherein the second storage is a subscriber identity module (SIM) card.

4. The content sharing system according to claim 1, wherein the first image and the second image include information for identifying the first information communication apparatus or the first user.

5. The content sharing system according to claim 1, wherein the first information communication apparatus further includes a third storage which stores an address book including one or more telephone numbers, and the first identification information is information included in the address book.

6. The content sharing system according to claim 5, wherein the first identification information is a phone number, an e-mail address, a short message service (SMS) address, or social networking service (SNS) account information of the second user.

7. The content sharing system according to claim 1, wherein the third executable instructions, when executed by the third processor, cause the server to further generate a plurality of the sharing space in the first storage, and store in the first storage the first identification information corresponding to each of the sharing spaces, the connection request message includes sharing space specifying information for specifying a destination sharing space, and allow the second information communication apparatus to access the destination sharing space when the second identification information included in the connection request message matches the first identification information corresponding to the destination sharing space specified from among the sharing spaces, and prohibit the second information connection device from accessing the destination sharing space when the second identification information fails to match the first identification information.

8. The content sharing system according to claim 7, wherein the second information communication apparatus further includes:

a display configured to display a sharing space list of the sharing spaces generated on request of the first information communication apparatus; and the second executable instructions, when executed by the second processor, cause the second information communication apparatus to further obtain information indicating a sharing space selected from the sharing space list by the second user, and the destination sharing space is the sharing space indicated by the obtained information.

9. The content sharing system according to claim 1,
wherein the first executable instructions, when executed by the first processor, cause the first information communication apparatus to further display the first image and information indicating the second user simultaneously, after the first image is captured.

10. The content sharing system according to claim 1, wherein the content which is obtained in the place includes pictures and/or videos of contents of the place.

11. The content sharing system according to claim 1, wherein the content which is obtained in the place includes content, obtained by at least one of the first user and the second user, associated with contents of the place.

12. A content sharing method using a server, a first information communication apparatus, and a second information communication apparatus, for sharing, in situ, content which is obtained in a place, between a first user and a second user present in the place, using a sharing space which is a storage area on the server, the first information communication apparatus operated by the first user, the second information communication apparatus operated by the second user, and the second user being different from the first user, the content sharing method comprising:

displaying a screen that prompts the first user to capture a first object, present in the place, for authentication;

generating a first image by capturing the first object according to an operation by the first user on the screen;

sending from the first information communication apparatus to the server a reserve request message for requesting to reserve the sharing space to be newly generated, the reserve request message including first identification information and the first image, the first identification information for identifying the second information communication apparatus or the second user;

upon receiving the reserve request message, generating the sharing space in a first storage of the server, and storing in the first storage the first identification information included in the reserve request message, using the server;

displaying a screen that prompts the second user to capture, for authentication, a second object, present in the place, that is the same as the first object captured by the first information communication apparatus according to the operation by the first user;

generating a second image by capturing the second object according to an operation by the second user on the screen;

sending from the second information communication apparatus to the server a connection request message including second identification information and the second image, the second identification information for identifying the second information communication apparatus or the second user; and allowing the second information communication apparatus to access the sharing space when it is determined by the server that (i) the second identification information included in the connection request message matches the first identification information stored in the first storage and that (ii) the second object in the second image included in the connection request message and the first object in the first image included in the first storage are the same object, and prohibiting the second information communication apparatus from accessing the sharing space when it is determined by the server that (iii) the second identification information fails to match the first identification information and that (iv) the second object in the second image and the first object in the first image are not the same object.

* * * * *